US010794881B2

(12) United States Patent
Rosano et al.

(10) Patent No.: US 10,794,881 B2
(45) Date of Patent: Oct. 6, 2020

(54) SYSTEMS, DEVICES, AND METHODS FOR THRESHOLD ANALYTE CALIBRATION AND QUANTITATION USING THRESHOLD ANALYTE CALIBRATION

(71) Applicant: Waters Technologies Corporation, Milford, MA (US)

(72) Inventors: Thomas G. Rosano, Albany, NY (US); Michelle Wood, Warrington (GB)

(73) Assignee: Waters Technologies Corporation, Milford, MA (US)

( * ) Notice: Subject to any disclaimer, the term of this patent is extended or adjusted under 35 U.S.C. 154(b) by 455 days.

(21) Appl. No.: 15/557,900

(22) PCT Filed: Mar. 16, 2016

(86) PCT No.: PCT/US2016/022563
§ 371 (c)(1),
(2) Date: Sep. 13, 2017

(87) PCT Pub. No.: WO2016/149316
PCT Pub. Date: Sep. 22, 2016

(65) Prior Publication Data
US 2018/0292367 A1    Oct. 11, 2018

Related U.S. Application Data

(60) Provisional application No. 62/211,855, filed on Aug. 30, 2015, provisional application No. 62/133,717, filed on Mar. 16, 2015.

(51) Int. Cl.
*G01N 30/86* (2006.01)
*G01N 30/04* (2006.01)
*G01N 30/72* (2006.01)
*G01N 30/88* (2006.01)

(52) U.S. Cl.
CPC ......... *G01N 30/8665* (2013.01); *G01N 30/04* (2013.01); *G01N 30/72* (2013.01); *G01N 30/8679* (2013.01); *G01N 30/8693* (2013.01); *G01N 30/7233* (2013.01); *G01N 2030/042* (2013.01); *G01N 2030/8813* (2013.01)

(58) Field of Classification Search
None
See application file for complete search history.

(56) References Cited

U.S. PATENT DOCUMENTS

| | | | | |
|---|---|---|---|---|
| 6,582,963 B1 * | 6/2003 | Weigl | ................... | B01F 5/0403 422/81 |
| 8,268,388 B1 * | 9/2012 | Boss | ................... | G01N 21/278 427/167 |
| 2005/0165560 A1 * | 7/2005 | Kushnir | .............. | H01J 49/0009 702/30 |
| 2008/0234945 A1 * | 9/2008 | Walk | .................. | G01N 30/8668 702/19 |
| 2009/0090856 A1 | 4/2009 | Grant et al. | | |
| 2012/0058009 A1 * | 3/2012 | Nogami | ............... | G01N 1/4055 422/63 |
| 2013/0040857 A1 | 2/2013 | Anderson | | |

FOREIGN PATENT DOCUMENTS

| | | | |
|---|---|---|---|
| WO | 2008144937 A1 | 12/2008 | |
| WO | 2011/068917 A1 | 6/2011 | |

OTHER PUBLICATIONS

International Search Report and Written Opinion issued for International Application No. PCT/US2016/022563 dated May 17, 2016 and dated Jun. 9, 2016.
Buchholz et al. "Quantification of Intracellular Metabolites in *Escherichia coli* K12 Using Liquid Chromatography-Electrospray Ionization Tandem Mass Spectrometric Techniques." Anal. Biochem. 295(2001): 129-137.
Jones Stuart: "Making an HPLC calibration work (Part 1)." Chromatog. Focus. (2009): 1-3. https://www.labmate-online.com/article/chromatography/1/laserchrom-hplc-laboratories-ltd/making-an-hplc-calibration-work-part-1/536.
Rosano et al. "Multi-dru and Metabolite Quantification in Postmortem Blood by Liquid Chromatography-High-Resolution Mass Spectrometry: Comparison with Nominal Mass Technology." J. Anal. Toxicol. 38(2014): 495-506.

* cited by examiner

*Primary Examiner* — Michael L Borin
(74) *Attorney, Agent, or Firm* — Womble Bond Dickinson (US) LLP; Deborah M. Vernon; Heath T. Misley

(57) ABSTRACT

Provided herein are definitive screening techniques for qualitatively and quantitatively detecting analytes in biological specimens.

20 Claims, 19 Drawing Sheets

Inter Urine Reproducibility of TAC Calibration Ratio
Benzoylecgonine Calibrator Prepared in 7 Urine Pools

In-Well Sample Preparation:

NEAT   SPIKED

Reagents per well:

- 200μL of urine sample
- 50μL Negative urine / Threshold-analyte reference mixture
- 50μL Injection-recovery Standard (Methapyrilene)
- 50μL β-glucuronidase enzyme mix → 1hr incubation at 55°C
→ Dilution (4 folds)
→ Filtration.

LC-MS analysis

High Throughput Filter-Plate Preparation

Calibration Performance of TAC Quantification
Coefficient of Determination ($R^2$)

Mean and SD range of $R^2$ for linear regression analysis of calibration data (10 analytical runs) for 42 analytes.

Percent coefficient of variation with calibrator data reanalyzed from regression equation for 10 analytical runs. Calibrators concentrations at 25, 50, 200, 500, 1000 and 1500 percent of threshold concentration.

Percent coefficient of variation with quality control material analyzed in 10 analyticalruns. Controls at 40, 125 and 1500 percent of threshold concentration.

Quality Control Accuracy in TAC Quantitation
Bias Plots

Percent bias for quality control material analyzed in 10 analytical runs. Controls at target concentrations of 40, 125 and 1500 percent of threshold concentration.

SYSTEMS, DEVICES, AND METHODS FOR THRESHOLD ANALYTE CALIBRATION AND QUANTITATION USING THRESHOLD ANALYTE CALIBRATION

RELATED APPLICATIONS

This application is a 35 U.S.C. § 371 national stage filing of International Application No. PCT/US2016/022563, filed Mar. 16, 2016, which claims priority to U.S. Provisional Application No. 62/133,717, filed Mar. 16, 2015 and U.S. Provisional Application No. 62/211,855, filed Aug. 30, 2015, each of which are incorporated herein by reference.

FIELD OF THE INVENTION

The present invention generally relates to methods of liquid chromatography and mass spectrometry, in particular methods of liquid chromatography and mass spectrometry in which normalization for matrix effects on the mass spectrometry analysis is useful.

BACKGROUND

Currently, analyte screening (e.g. drug screening) in biological specimens (e.g. urine) is performed by immunoassay using competitive or immunometric binding techniques. The selectivity of immunoassay is dependent upon the immunoreactivity of an epitope on the analyte with the reagent antibody employed in the assay. It is well known that classes of analytes with similar epitope such as opiates, benzodiazepines or amphetamines may cross-react in the screening immunoassay. Immunoassay is therefore not selective for detection of a specific analyte, but may detect with varying reactivity analytes within the class. In addition, immunoassay cross-reactivity may occur with any endogenous or exogenous chemical that is recognized by and binds to the epitope binding site, and also with other binding of endogenous and exogenous chemicals due to non-specific binding to the antibody. Screening immunoassays are calibrated with a biological specimen containing a threshold concentration of one of the epitope-similar class of analytes. Therefore, immunoassay methods may not be capable of definitive identification of an analyte. Further testing is therefore needed for definitive identification. Immunoassays provide only provide presumptive identification of an analyte or analyte class and are classified a presumptive rather than a definitive test.

Given the deficiencies associated with immunoassays, the continued concern on the impact of chemical and biological agents to public health, and the increasing attentiveness to identify new drug candidates to combat disease, the need exists for definitive high throughput analyte screening techniques (e.g., drug screening).

SUMMARY

Provided herein are non-presumptive (i.e., definitive) screening techniques for detecting analytes in biological specimens. Techniques include e.g., the use of threshold analyte calibration in chromatographic (such as liquid chromatography-mass spectrometry technology) separations for selective drug and metabolite detection. These techniques have numerous advantages over conventional immunoassay-based methods.

For example, in contrast to immunoassay, the TAC assays described herein represent a definitive test for the detection and identification of analyte(s) in the screening of biological specimens. Additionally, immunoassay may be positive for any endogenous or exogenous agent that is present in a biological specimen, i.e., be non-selective. For example, if an agent binds to an antibody simply because of epitope similarity or nonspecific binding, immunoassay may not be able to distinguish these events from specific binding events, therefore leading to a false positive result. Because TAC assay, however, uses liquid chromatography-mass spectrometry technology in the analysis, this allows for selective detection and identification of analytes.

Another advantage of the TAC assays described herein is that they allow for multi-analyte detection and identification in a single analytical screening run. See e.g., FIG. 4. Presumptive screening by immunoassay requires multiple assays for each analyte class.

Yet another advantage of the TAC assays described herein is that they require only the availability of purified analyte for use as a reference-analyte. In other words, the TAC assays described herein can be rapidly adapted to the screening of newly emerging analytes (e.g. designer drugs). In contrast, immunoassay screening requires commercial development of antibodies and other immunoassay reagents, which may not be available for newly emerging analytes.

Yet another advantage of the TAC assays described herein is that they allow threshold-accuracy for each specimen analyzed. Immunoassays, in contrast, are calibrated only with a single member of the analyte class. Varying reactivity with other members of the analyte class alter the threshold detection concentration for the members of the analyte class.

Yet another advantage of the TAC assays described herein is that they represent a definitive test for both qualitative and quantitative determination. In the case of immunoassay, isotope dilution techniques are currently used as the second test once a presumptive result is attained. Accurate analyte quantification by isotope dilution technique (at both the threshold concentration and across the analytical range of concentration found in biological specimens) requires the availability of an isotopic standard (e.g. deuterated standard) for each analyte. The isotopic standard for each analyte is needed in order to compensate for matrix effect that may variably occur in each biological sample being tested. See e.g., FIG. 1 and FIG. 2. The issue with this approach is that isotopic standards are not available for all drugs and metabolites, especially newly emerging designer drugs. For at least this reason, isotope dilution is not easily adapted for screening large numbers of biological specimens for multi-analytes. The described TAC methods, however, are not limited by the availability of isotopic standards. This is because the disclosed methods compensate for matrix effect by e.g., the inclusion of a spiked reference analyte that interacts with the biological matrix in an identical manner as any analyte in the neat biological sample. See e.g., FIG. 3.

The present methods solve the problems associated with conventional immunoassay-based methods by providing, at a minimum: a definitive test for the detection and identification of analyte(s) in the screening of biological specimens (both qualitatively and quantitatively), multi-analyte detection and identification in a single analytical screening run, method which require only the availability of purified analyte for use as a reference-analyte, and threshold-accuracy for each specimen analyzed. In addition, in finding solutions to the problems associated with conventional immunoassay-based methods, it was unexpectedly discovered for the TAC quantitative methods described herein that a concentration of reference analyte, many times greater than the threshold concentration used in exemplary embodiments of the TAC screening and detection techniques disclosed herein, resulted in a linearization of the relationship between TAC ratio and concentration. See e.g., FIG. 15. The resulting linear relationship between TAC ratio and concentration allows for both qualitative and quantitative determinations of multiple analytes in a single assay.

Also provided herein are means for calculating threshold ratios and calibrations quantitation relationship of analytes following the methods described herein.

DETAILED DESCRIPTION

Figure 1:
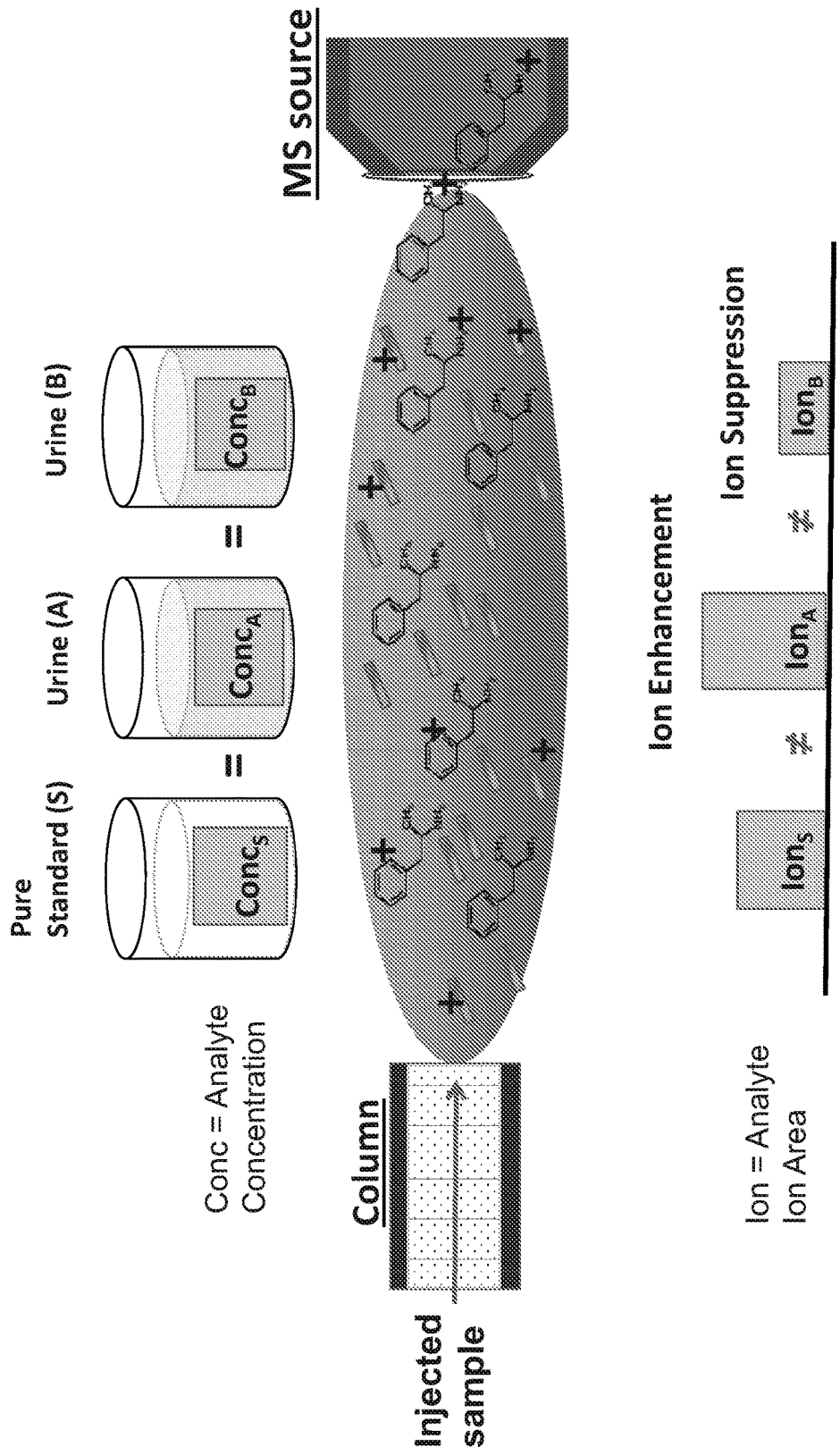
FIG. 1 illustrates the influence of a matrix effect on ion area counts using three urine samples with the same concentration of analyte.
Figure 2:
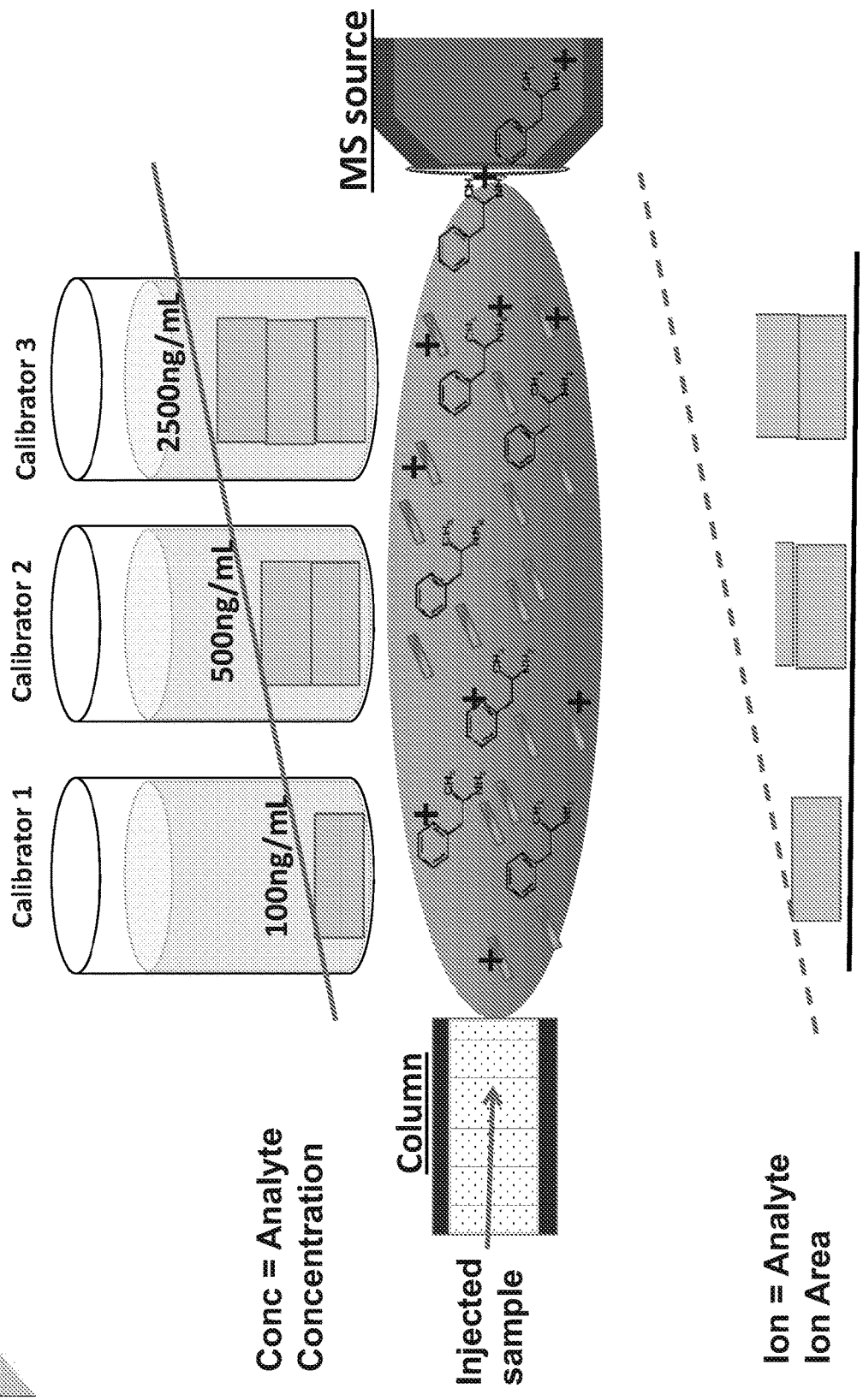
FIG. 2 illustrates the influence of matrix effect on ion area counts using three urine samples with the different concentration of analyte
Figure 3:
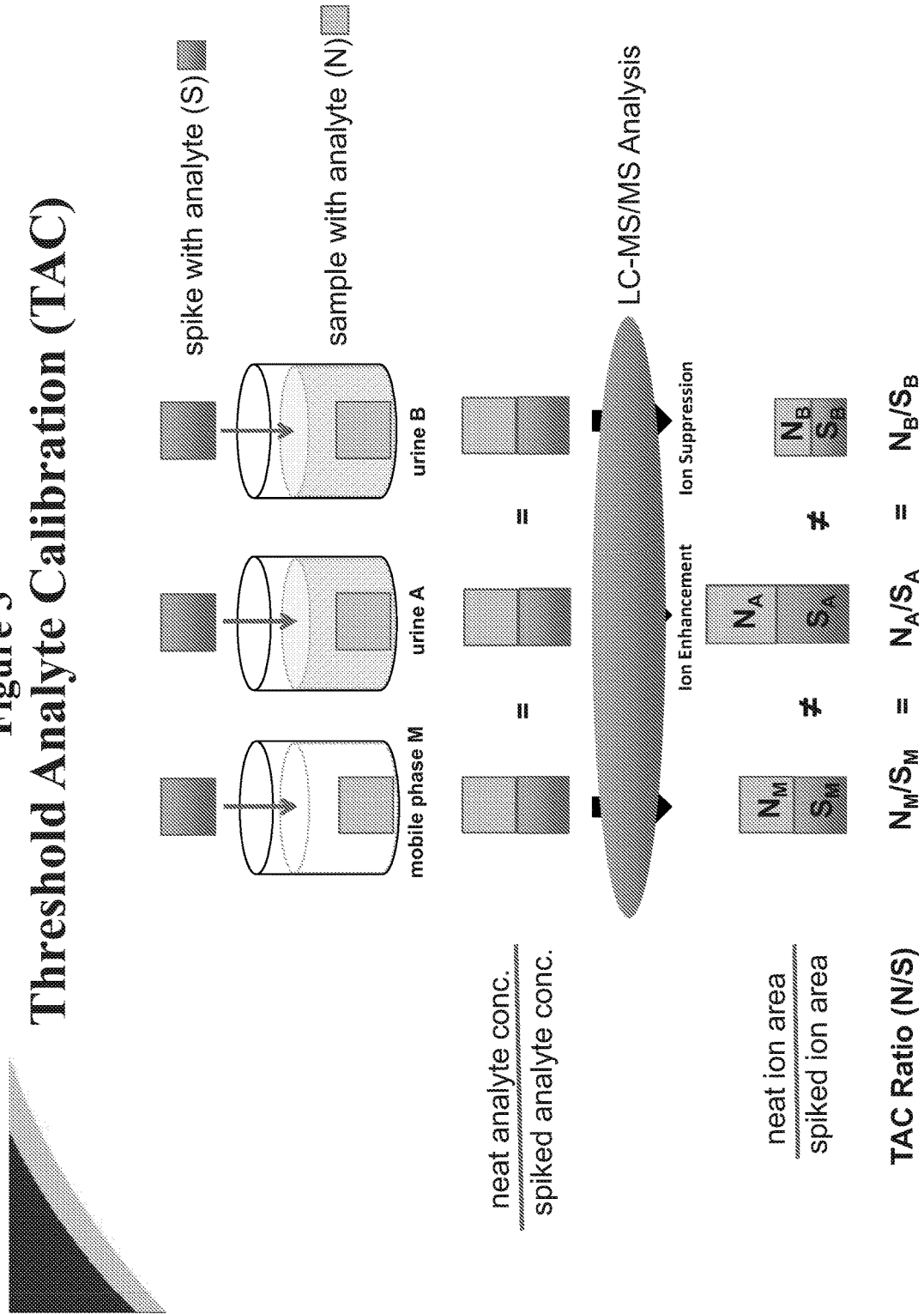
FIG. 3 illustrates the normalization of matrix effects using the methods described herein by analysis of a sample before and after spiked addition (S) of a threshold concentration of reference analyte.
Figure 4:
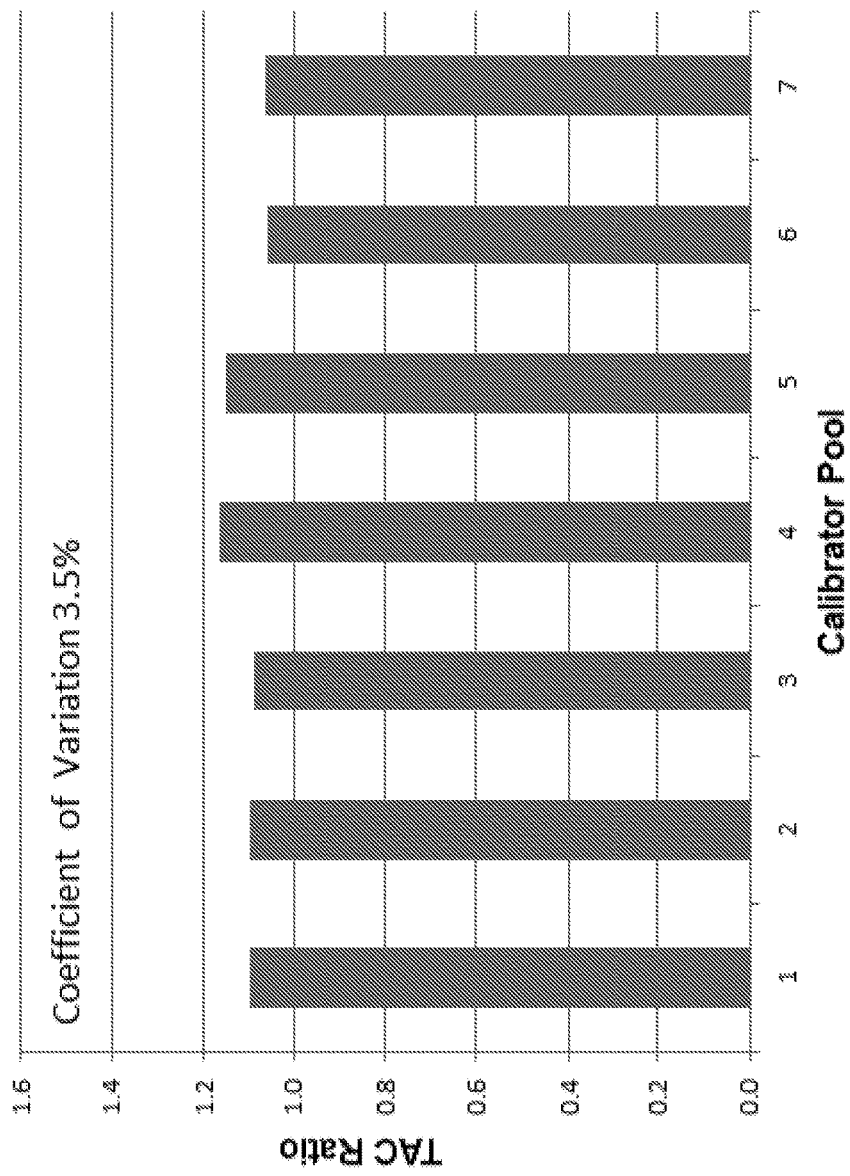
FIG. 4 illustrates the inter urine reproducibility of TAC calibration ratio according to the methods described herein.
Figure 5:
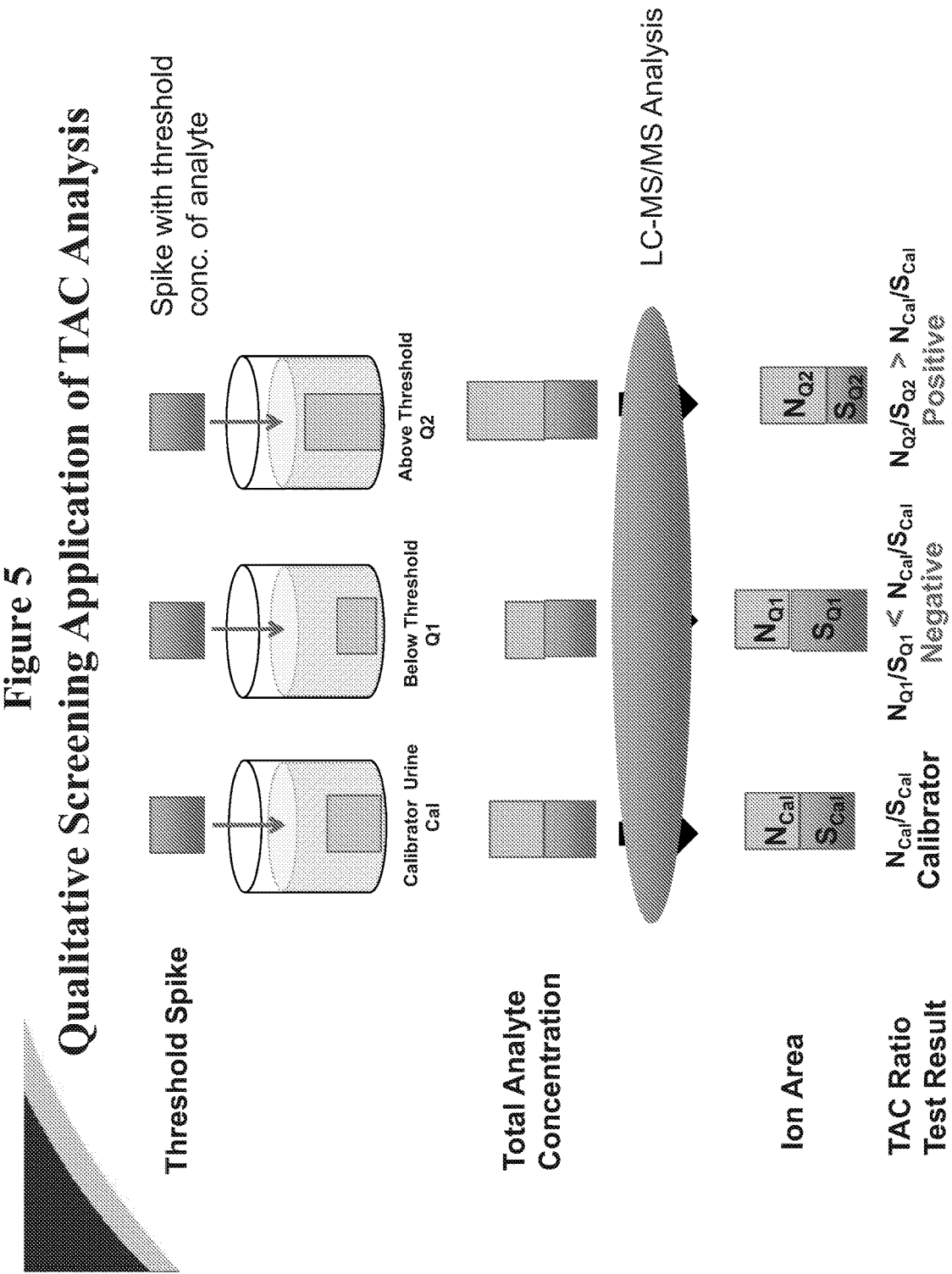
FIG. 5 represents qualitative screening application of TAC analysis following the methods described herein.
Figure 6:
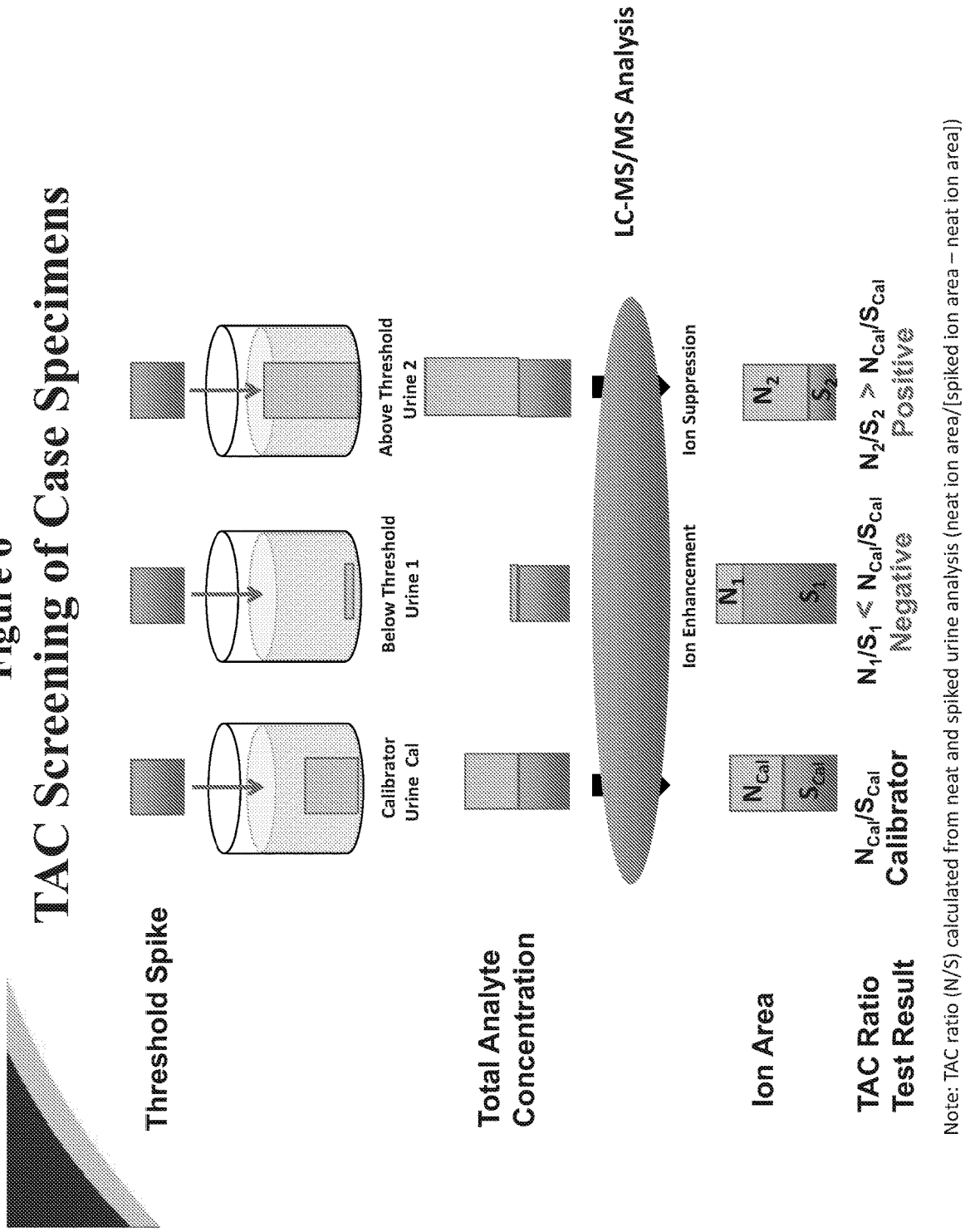
FIG. 6 illustrates the TAC screening of case specimens following the methods described herein.
Figure 7:
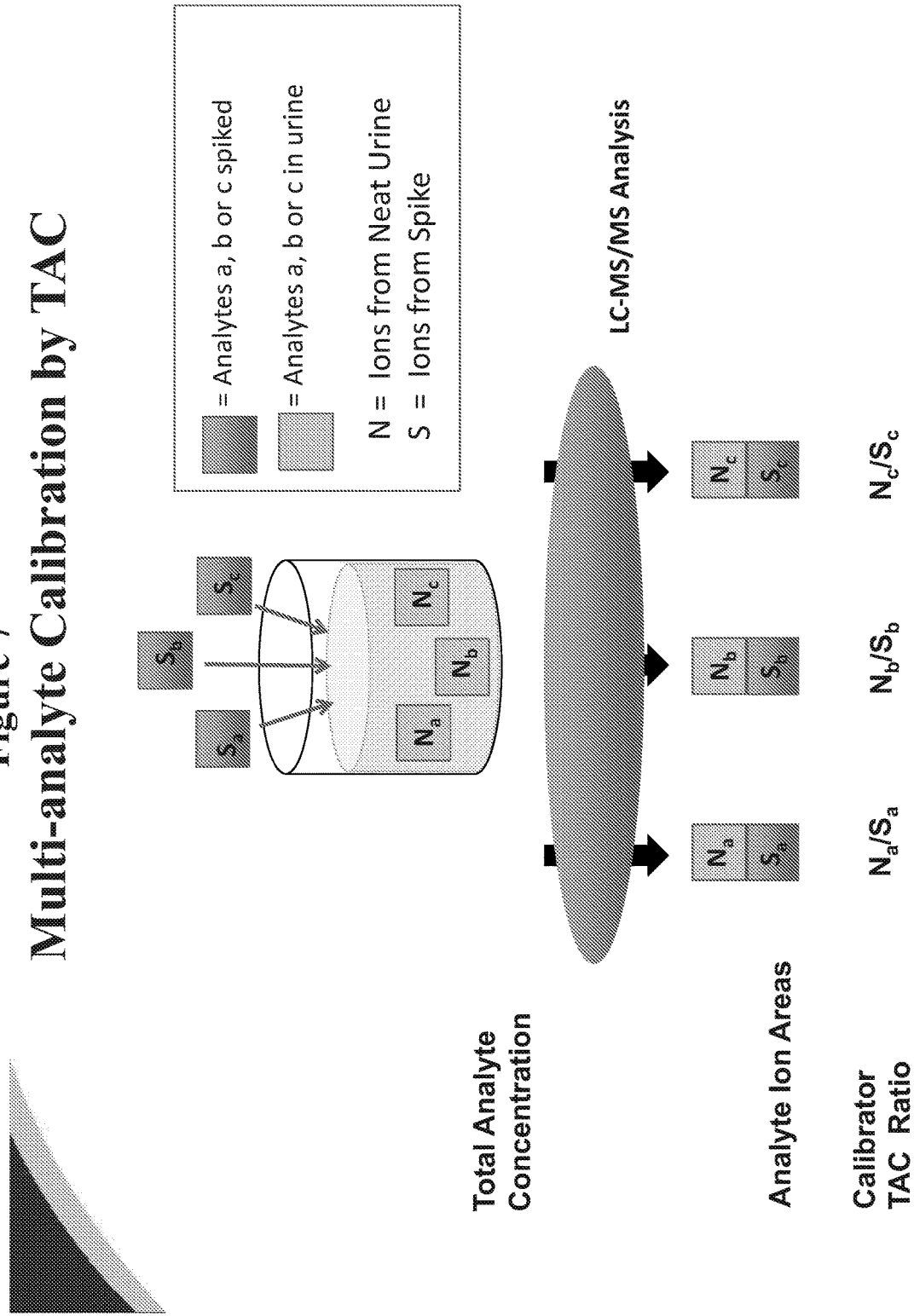
FIG. 7 illustrates an exemplary embodiment of a multi-analyte calibration by TAC technique as described herein.
Figure 8:
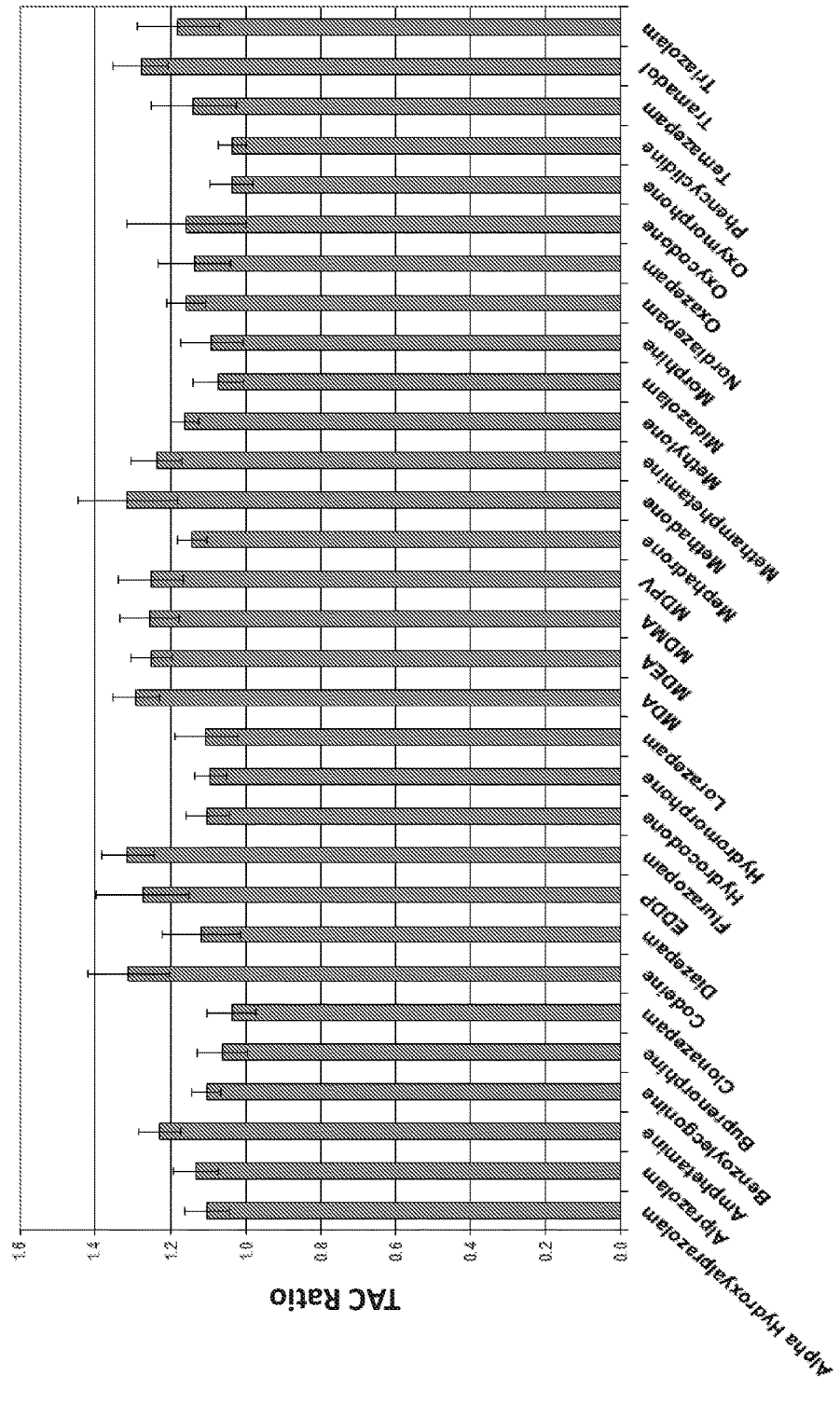
FIG. 8 illustrates the TAC ratio for analytes tested by the methods described herein.
Figure 9:
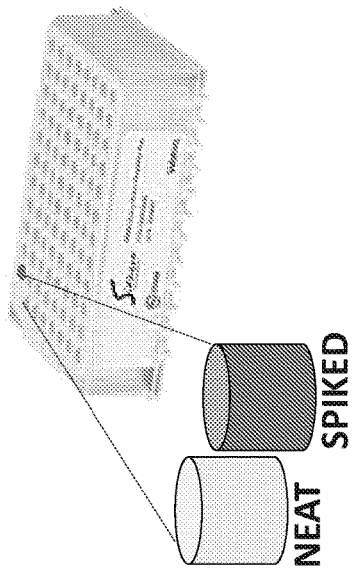
FIG. 9 represents in-well sample preparation according to the methods described herein.

Threshold analyte calibration ("TAC") is an analytical technique or process described herein that employs liquid chromatography-mass spectrometry technology and allows for accurate and selective screening, detection, identification and quantitation of single or multiple analytes (e.g., drugs, drug metabolites or other chemical agents) in biological specimen types (e.g., urine, oral fluid, blood, hair, nails and other body fluids or tissue). TAC utilizes threshold concentration criteria to positively detect and identify analytes and/or to determine the relationship between TAC ratio and analyte concentration for quantitation purposes.

When used as a screening and detection technique ("TACS"), the TAC methods herein comprise determining a concentration threshold as described herein to positively identify an analyte in a biological sample. Calibration in TACS methods can be performed by assaying a biological specimen containing a threshold concentration of analyte. See e.g., FIGS. 4-9.

In one aspect, following an optional pre-analytical processing or clean-up of a specimen, the screening and detection ("TACS") assay method comprises preparation and analysis of a biological specimen with and without addition of a reference-analyte preparation. The biological specimen is analyzed twice, once without a reference-analyte addition (Neat) and once with a reference analyte addition (Neat+Spike). A TAC ratio of Neat to Spike analyte-ions is then calculated for each biological specimen type analyzed. The Spike analyte-ion count or area is determined by the difference in analyte-ions between the Neat+Spike and the Neat analyses. For assay of each biological specimen type, a TAC ratio is calibrated for threshold-accurate drug detection and identification by TAC analysis of a negative biological specimen sample supplemented with reference analyte at the threshold concentration. The TAC ratio is then used to selectively and accurately detect analytes in biological specimens having unknown concentrations of analyte using standard quality control practices.

When used as a quantitation technique ("TACQ"), the TAC methods herein comprise the use of multiple calibrators to define a relationship between the TAC ratio and the concentration of analyte in the sample being analyzed over the linear range of that relationship. See e.g., FIGS. 15-18.

In one embodiment, following an optional pre-analytical processing or clean-up of a specimen, the quantitative ("TACQ") assay method comprises the preparation and analysis of a series of biological specimens having different concentrations of analyte with and without addition of reference-analyte preparations. Each biological specimen is analyzed twice, once without the reference-analyte addition (Neat) and once with a reference analyte addition (Neat+Spike). A TAC ratio of Neat to Spike analyte-ions is then calculated for each biological specimen analyzed. The Spike analyte-ion count or area is determined by the difference in analyte-ions between the Neat+Spike and the Neat analyses. A regression analysis is then used to determine the relationship between TAC ratio and analyte concentration for the series of biological specimens. The relationship between TAC ratio and analyte concentration is then used to determine the quantity of analyte in the biological specimens with unknown concentrations of analyte using standard quality control practices.

The TAC assay methods described herein are applicable for assaying any analyte where a purified preparation of the analyte (reference analyte) is available, including, but not limited to newly emerging analytes (e.g. designer drugs) where labeled internal standards are not available. Both TACS and TACQ are applicable to assay methods using liquid chromatography-mass spectrometry technology.

Further methods for detecting and/or quantifying analytes in biological specimens are provided. In an exemplary embodiment, the methods comprise analyzing a first sample to obtain a first result, the first sample including a first portion of a biological specimen; analyzing a second sample to obtain a second result, the second sample including a portion of the biological specimen and a reference analyte at a defined concentration; and calculating a ratio between (i) the first result and (ii) a difference between the second result and the first result. In some embodiments, the method can further comprise comparing the ratio to a calibrated threshold ratio. In various embodiments, the method can also comprise determining a threshold analyte finding based on that comparison.

Figure 12:
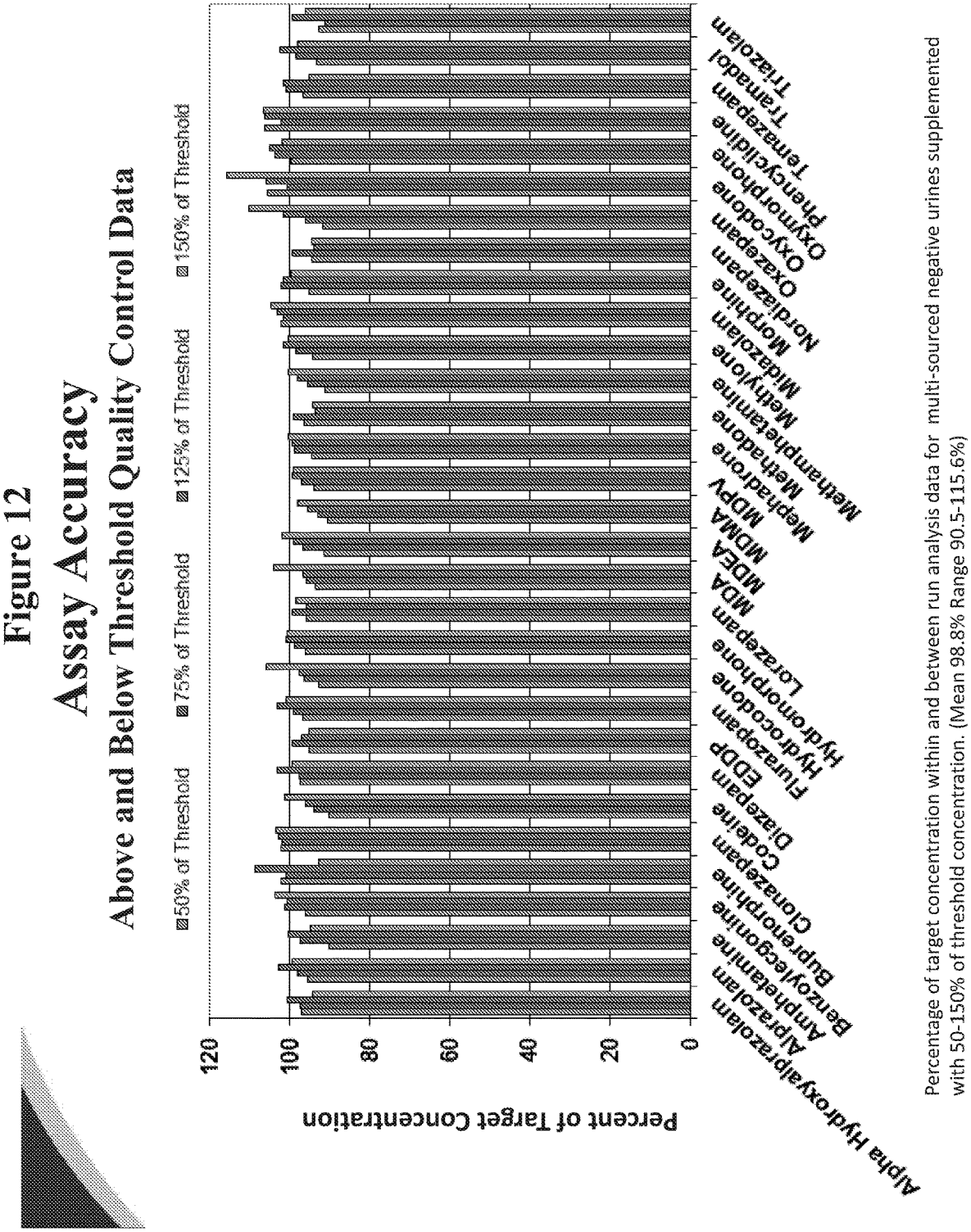
FIG. 12 illustrates the assay accuracy above and below threshold quality control data according to the methods described herein.
Figure 13:
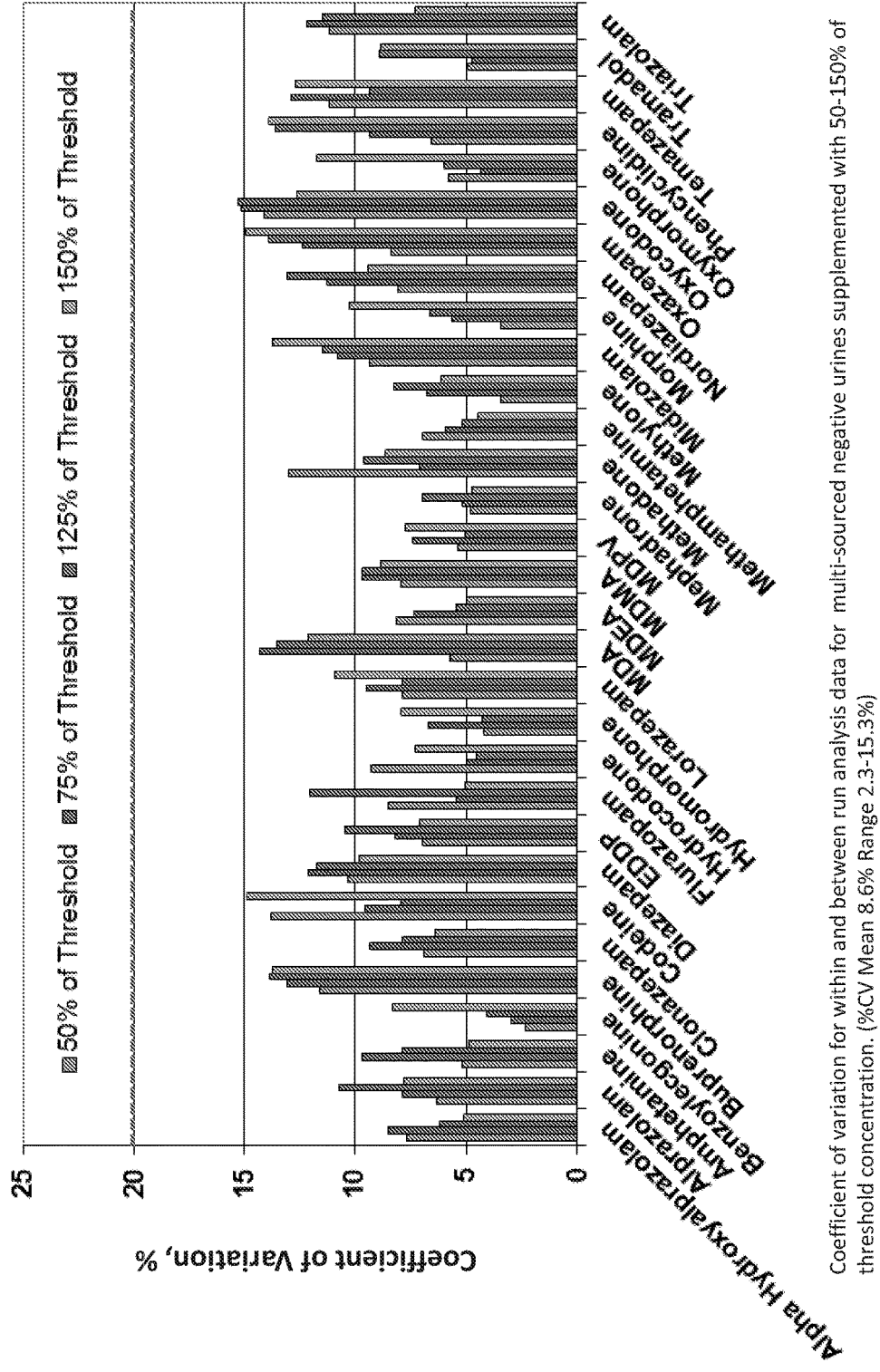
FIG. 13 illustrates the assay precision above and below threshold quality control data according to the methods described herein.

In exemplary embodiments, the steps for calculating the calibrated threshold ratio can comprise analyzing a known sample of a biological specimen to obtain a first calibration result; analyzing a combination of the known sample and the reference analyte at the defined concentration to obtain a second calibration result; and calculating the calibrated threshold ratio as a ratio between (i) the first calibration result and (ii) a difference between the second calibration result and the first calibration result. For example, the defined concentration of the reference analyte can be a threshold concentration of the analyte. In other examples, the defined concentration of the reference analyte can be higher or lower than the threshold concentration of the analyte. In some exemplary embodiments, the defined concentration can be in the range of about 10% of a threshold concentration of the analyte to about 750% of a threshold concentration of the analyte. For example, the defined concentration of the reference analyte can be any concentration between the upper and lower limits of linearity for the assay. See e.g., FIG. 12 and FIG. 13.

In another aspect, methods for quantifying analytes in biological specimens comprises analyzing a first sample to obtain a first result, the first sample comprising a first portion of a biological specimen; analyzing a second sample to obtain a second result, the second sample comprising a portion of the biological specimen and a reference analyte at a defined concentration; calculating a ratio between (i) the first result and (ii) a difference between the second result and the first result; and comparing the calculated ratio to a calibrated quantitation relationship and determining a quantity of an analyte in the biological sample based upon the calibrated quantitation relationship.

In another aspect, methods for detecting and quantifying analytes in biological specimens comprises analyzing a first sample to obtain a first result, the first sample including a first portion of a biological specimen; analyzing a second sample to obtain a second result, the second sample including a portion of the biological specimen and a reference analyte at a defined concentration; calculating a ratio between (i) the first result and (ii) a difference between the second result and the first result; and comparing said ratio to a calibrated quantitation relationship and, based on said comparison, determining both a quantity of an analyte in the biological specimen and a threshold analyte finding.

In exemplary embodiments, the steps for calculating the calibrated quantitation relationship can comprise analyzing a plurality of known samples of a biological specimen to obtain a plurality of first calibration results, the plurality of known samples each comprising a different concentration of a known analyte; analyzing each of the plurality of known samples combined with the reference analyte at the defined concentration to obtain a plurality of second calibration results; and calculating the calibrated quantitation relationship as a linear regression of (a) a plurality of ratios between (i) each of the plurality of first calibration results and (ii) a corresponding difference between each of the second calibration results and each of the first calibration results and (b) the corresponding different concentrations of the known analyte in the known samples. For example, the different or varied concentrations of a known analyte in the plurality of known samples can include at least a first concentration at a lower limit of quantitation and a second concentration at an upper limit of quantitation. The upper limit of quantitation can, in some examples, also refer to the upper limit of linearity of the quantitation or the linearity of the quantitation up to the highest calibrator used in the assay, i.e., the highest concentration of known analyte used in the assay. The lower limit of quantitation can, in some examples, also refer to the lower limit of linearity of the quantitation, the linearity of the quantitation down to the lowest calibrator used in the assay, i.e., the lowest concentration of known analyte used in the assay, or the lowest limit of detection of the assay. In some embodiments, the different concentrations of a known analyte in the plurality of known samples can comprise a plurality of concentrations between a lower limit of quantitation and an upper limit of quantitation. In exemplary embodiments, the threshold concentration of the analyte can be between a first concentration at a lower limit of quantitation and a second concentration at an upper limit of quantitation. See e.g., FIG. 15.

In exemplary embodiments, the defined concentration of the reference analyte can be greater than about 15% of an upper limit of quantitation of the analyte. In some embodiments, the defined concentration of the reference analyte can be greater than about 25% of an upper limit of quantitation of the analyte. In some embodiments, the defined concentration of the reference analyte can be greater than about 30% of an upper limit of quantitation of the analyte. In some embodiments, the defined concentration of the reference analyte can be greater than about 50% of an upper limit of quantitation of the analyte. In some embodiments, the defined concentration of the reference analyte can be in the range of about 30% of an upper limit of quantitation of the analyte to about 50% of an upper limit of quantitation of the analyte. The reference analyte concentration refers to the final concentration of the reference analyte achieved after addition to the biological specimen.

Robotic automation of sample preparation in the TAC assay methods described herein could also be used and could improve the work flow associated with TAC assay methods. In addition, embodiments of the TAC technique of analysis can be used for quantification of analytes, as well as full quantitative analysis across the range of analyte concentrations found in biological samples. Quantitation is not needed for a screening method, but quantitative application of TAC can allow the method to be used for confirmatory testing where quantification of the analyte(s) is needed.

Biological specimens/samples used in the exemplary methods disclosed herein can include any material that is capable of being analyzed via chromatography such as e.g., urine, hair, blood, oral fluid, and other materials. In one aspect, the biological specimen/sample is urine.

Figure 14:
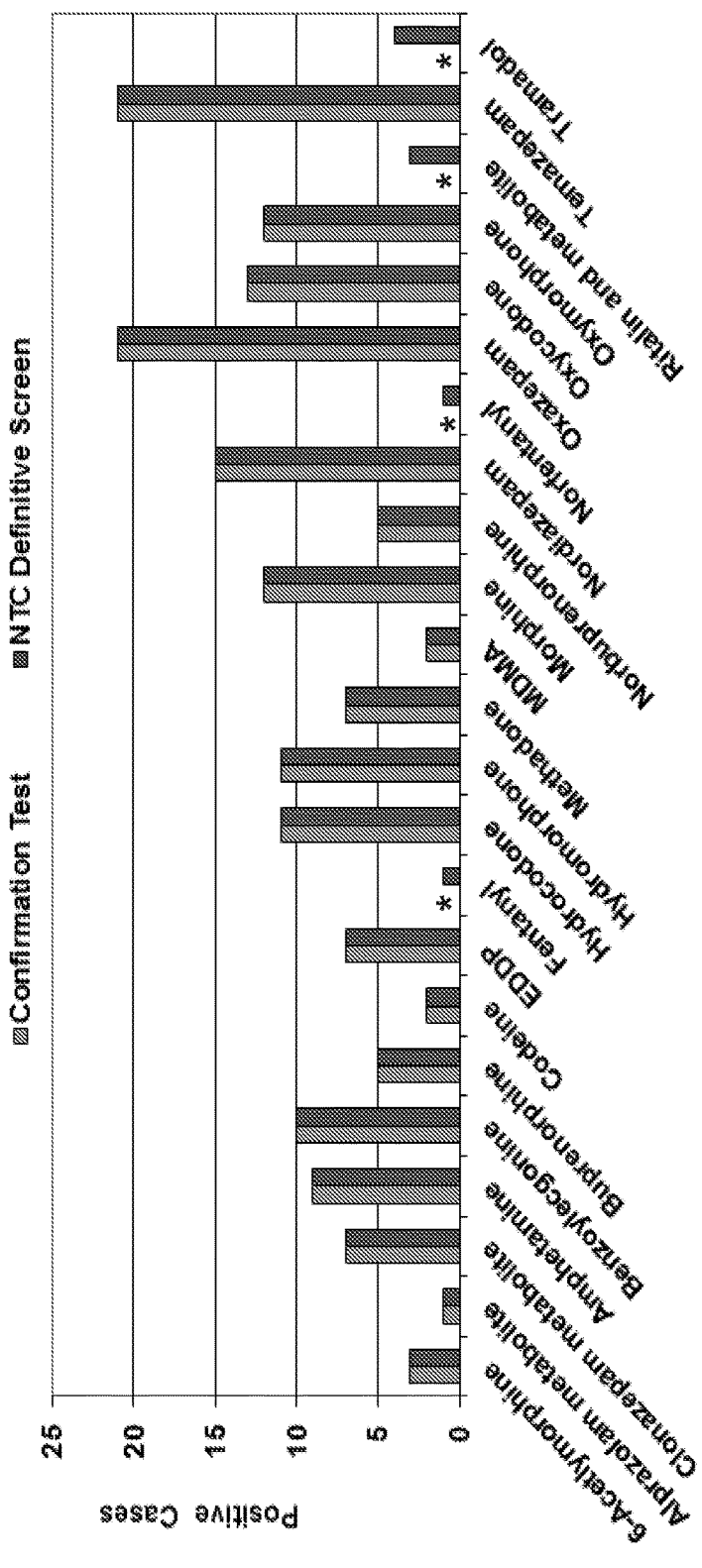
FIG. 14 represent confirmation testing vs. TAC screening according to the methods described herein.

Thus, in some embodiments, a threshold analyte calibration (TAC) method of UPLC-MS/MS analysis has been developed and validated for threshold-accuracy screening of targeted drugs in urine using either clinical or forensic testing protocols. The method comprises e.g., testing of urine with and without a reference analyte spike, using an initial test of the urine (neat) followed by analysis of the urine (spike sample) with the addition of analyte at a threshold concentration. See e.g., FIGS. 5 and 6. In one aspect, individual urine samples following this method show variations in the ion area for the same threshold concentration of analyte, due to matrix effects in electrospray ionization. However, the ion area ratio (TAC ratio) for analyte in neat urine to analyte in spiked urine is reproducible between urine specimens and allows threshold-accurate drug detection for each urine specimen. In one aspect, the TAC ratio is then calibrated for each analyte at threshold drug concentration by analysis of a negative urine sample supplemented with reference analytes at the threshold concentration. The calibrated response ratio is then used for selective and accurate drug detection in quality control and case specimens in the batch analysis. See e.g., FIG. 14.

Figure 10:
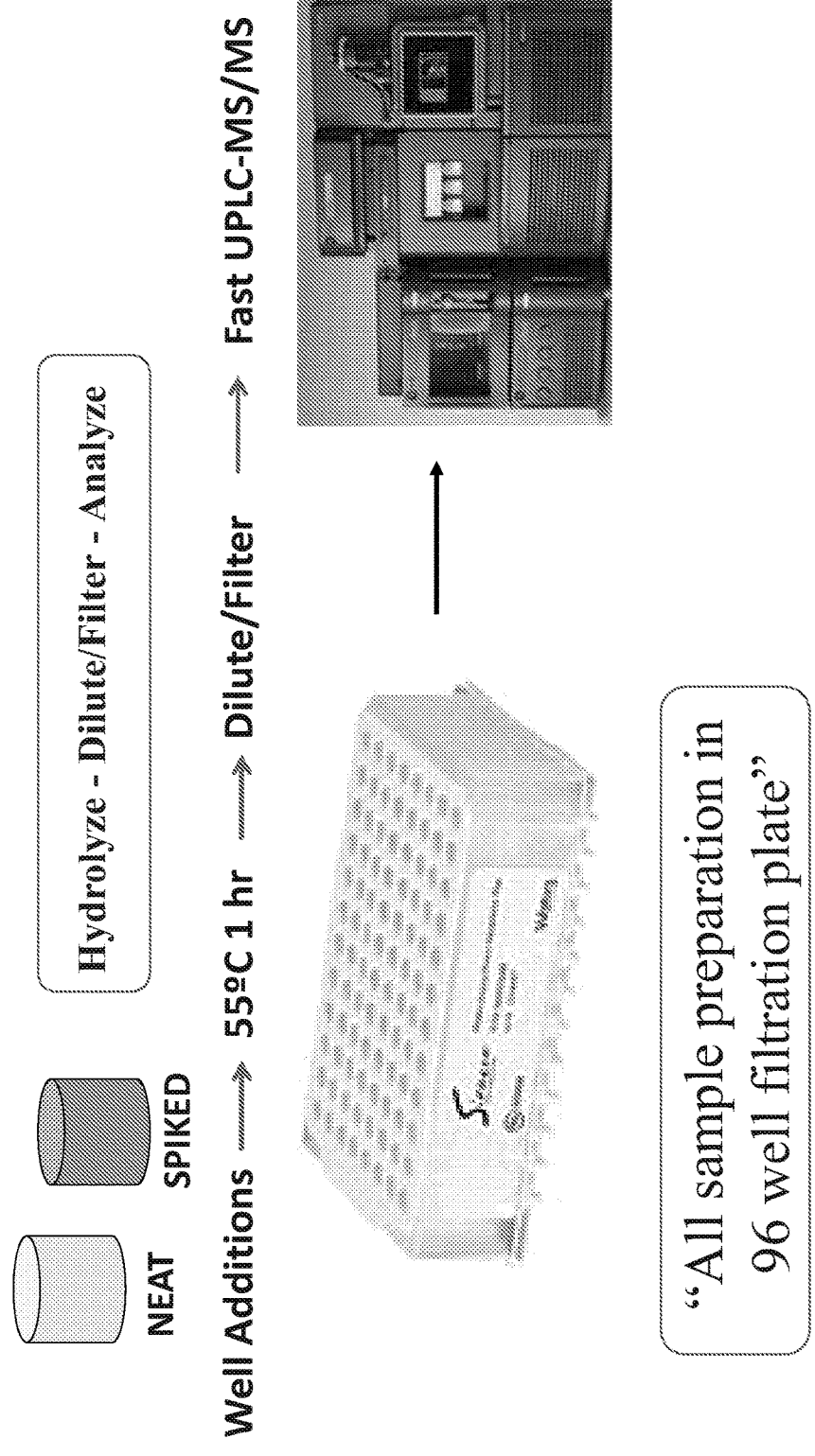
FIG. 10 represents rapid in-well sample preparation with hydrolysis according to the methods described herein.
Figure 11:
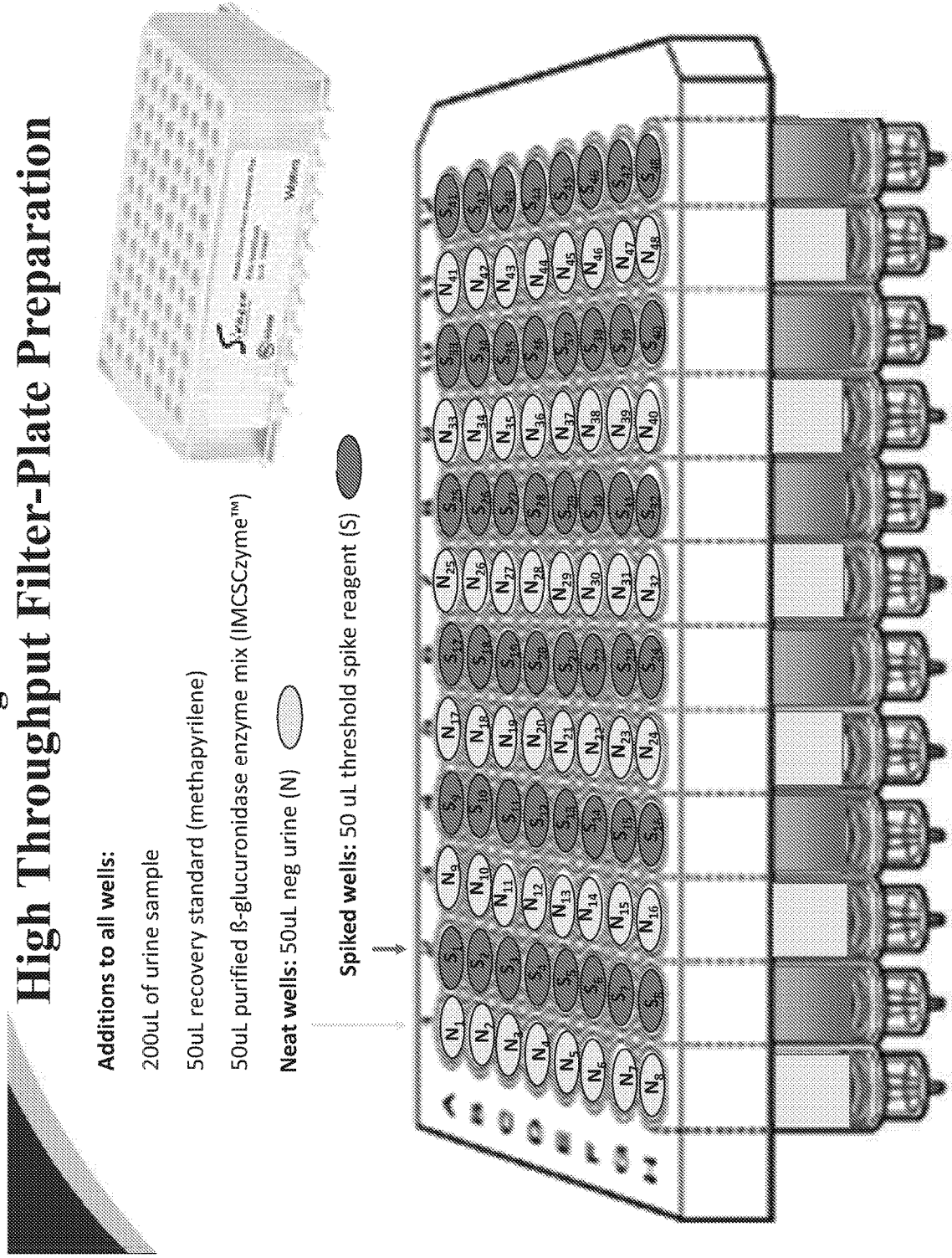
FIG. 11 represents high-throughput filter plate preparation according to the methods described herein.

In some embodiments, the procedure involves urine specimen accessioning by tray, followed by preparation of a custody-recorded aliquot of the primary specimen to be used for UPLC-MS/MS drug screening by the threshold calibration method. See e.g., FIG. 9. Prior to UPLC-MS/MS analysis, separate neat and spiked testing samples are hydrolyzed by incubation with a purified beta glucuronidase (IMCSzyme), diluted approximately five-fold with reagent additions plus starting mobile phase, and vacuum filtered. Methapyrilene is added to all neat and spike sample preparations to monitor UPLC injection volume reliability. The filtered samples are analyzed by UPLC-MS/MS in a 96 well plate format using selective reaction monitoring (SRM) with dual acquisition of diagnostic identifier and, when available, qualifier ion transitions. See e.g., FIGS. 9-11. The TAC ratio, ion area of analyte ion in neat analysis divided by spiked-analyte ion area in spiked analysis, is determined for a calibrator urine containing threshold concentration of analyte. The TAC ratio is then calculated for all quality control and test samples for accurate determination of threshold negative or positive analyte finding. In some embodiments, the method is quantitatively accurate at the threshold concentration range, but is not used for analyte quantification outside the threshold range.

In some embodiments, all negative test results may be reported after assay certification in both clinical and forensic protocols. Positive test results in clinical testing may also be reported after certification. In forensic testing, cases with threshold positive results may be reported as positive only after testing and certification as positive using another primary specimen aliquot and alternate method.

In one embodiment, a TAC quantitative method of UPLC-MS/MS analysis has also been developed for quantitation of targeted drugs in urine using either clinical or forensic testing protocols. See e.g., FIGS. 16-18. The method involves e.g., the determination of a relationship between TAC ratio and concentration for a given analyte. The relationship between TAC ratio and concentration is determined using multiple calibrators, i.e., samples with a range of known concentrations, to define the calibrator analysis and calibration curve relationship between the TAC ratio and the concentration of analyte in the sample being analyzed over the linear range established by the calibration curve. The range of that calibration extends from the lower limit of quantitation (LLOQ) to the upper limit of quantitation (ULOQ) of the assay with the lowest and highest calibrators positioned at those concentration points. The upper limit of quantitation can, in some examples, also refer to the upper limit of linearity of the quantitation or the linearity of the quantitation up to the highest calibrator used in the assay, i.e., the highest concentration of known analyte used in the assay. The lower limit of quantitation can, in some examples, also refer to the lower limit of linearity of the quantitation, the linearity of the quantitation down to the lowest calibrator used in the assay, i.e., the lowest concentration of known analyte used in the assay, or the lowest limit of detection of the assay.

Figure 15:
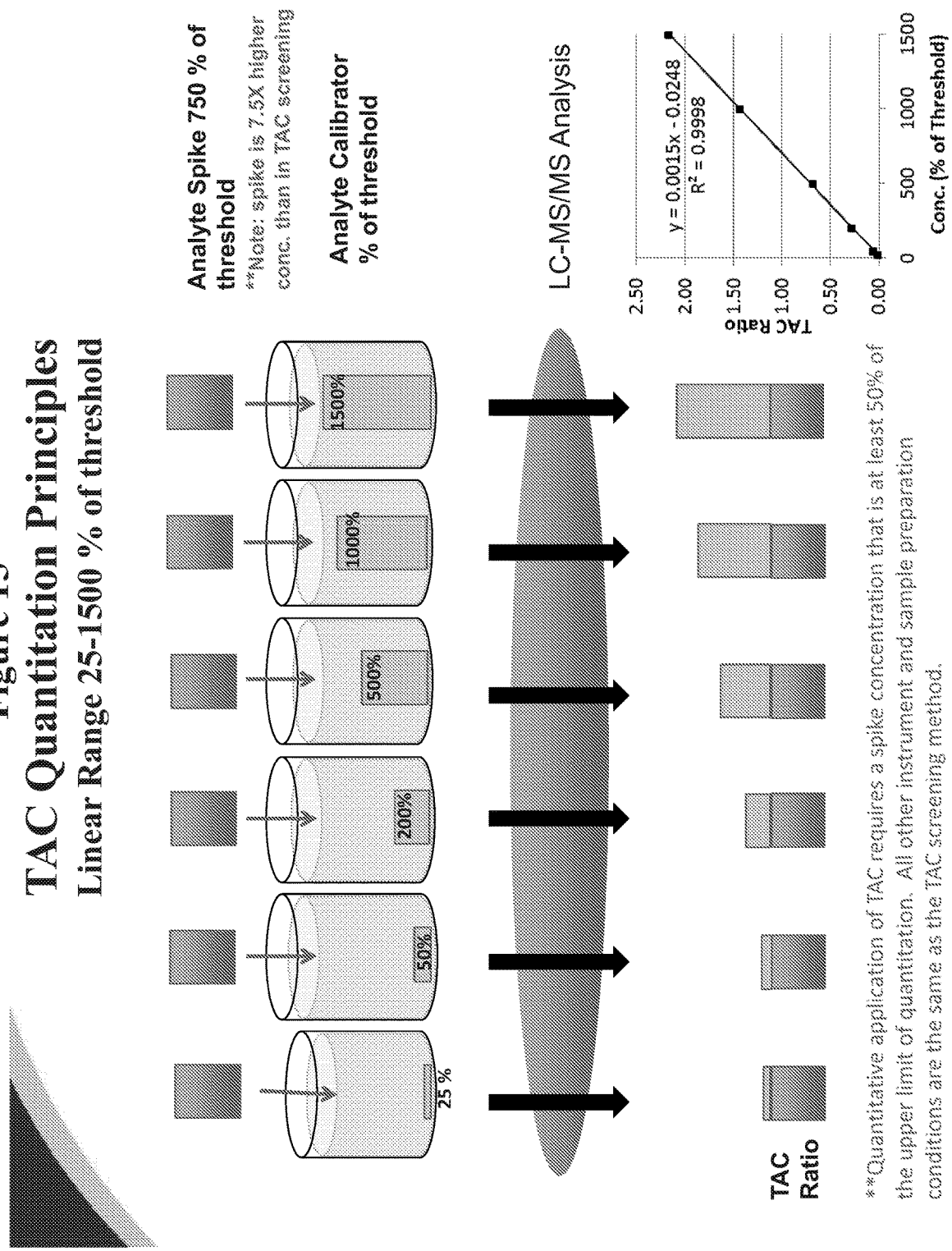
FIG. 15 illustrates TAC quantitation principles according to the methods described herein.
Figure 16:
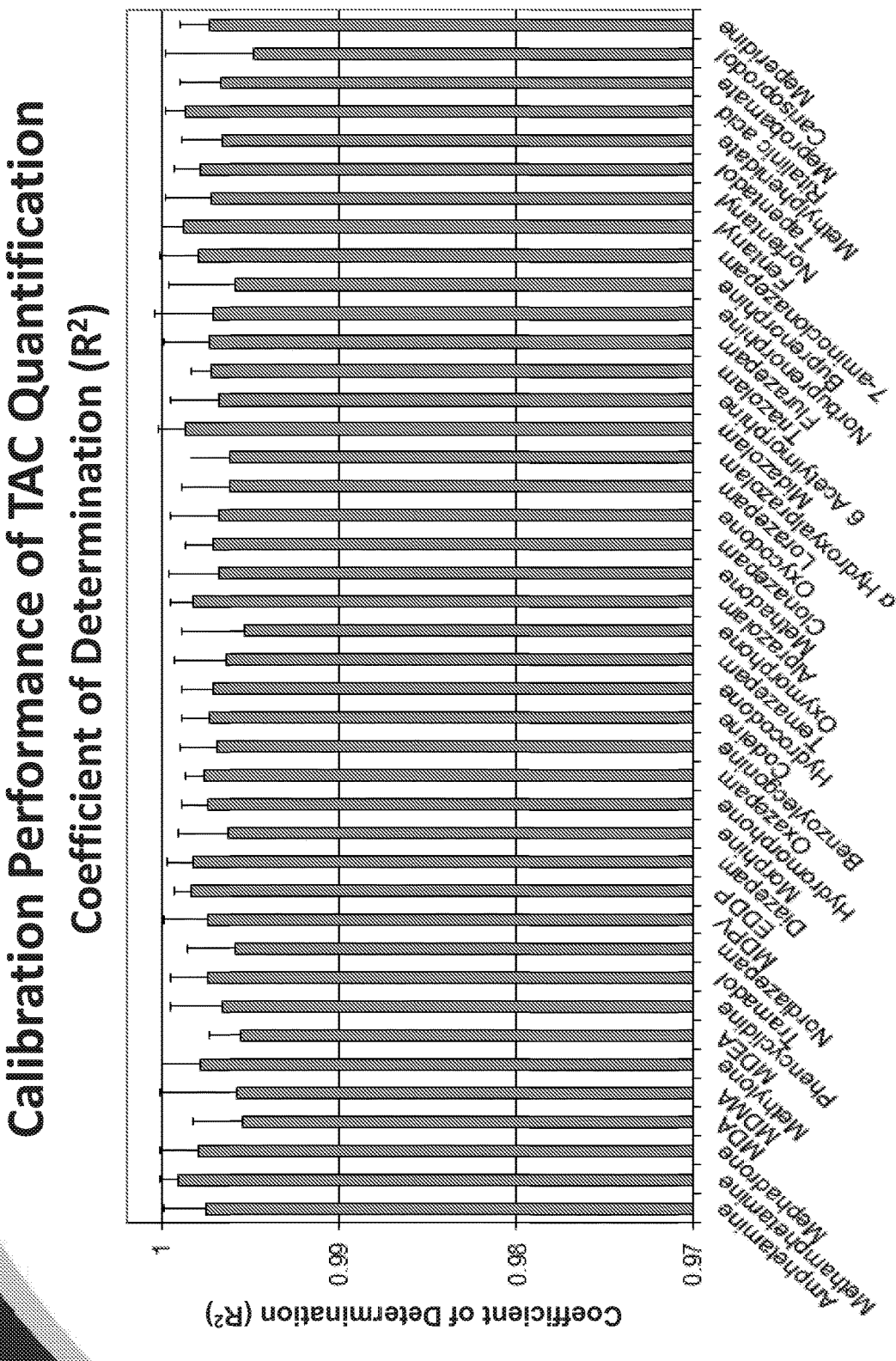
FIG. 16 illustrates the calibration performance of TAC quantitation according to the methods described herein.
Figure 17:
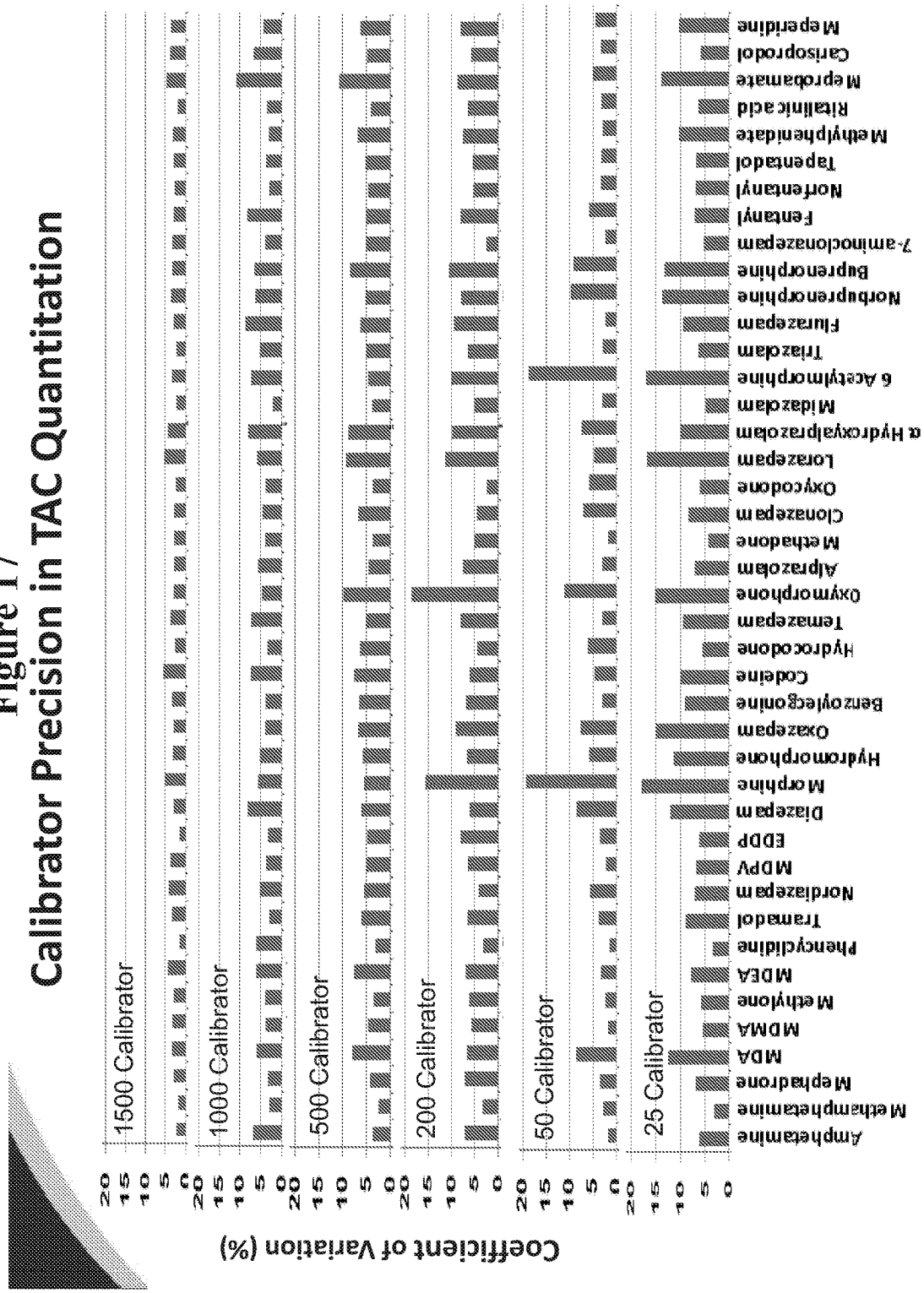
FIG. 17 illustrates the calibration precision of TAC quantitation according to the methods described herein.
Figure 18:
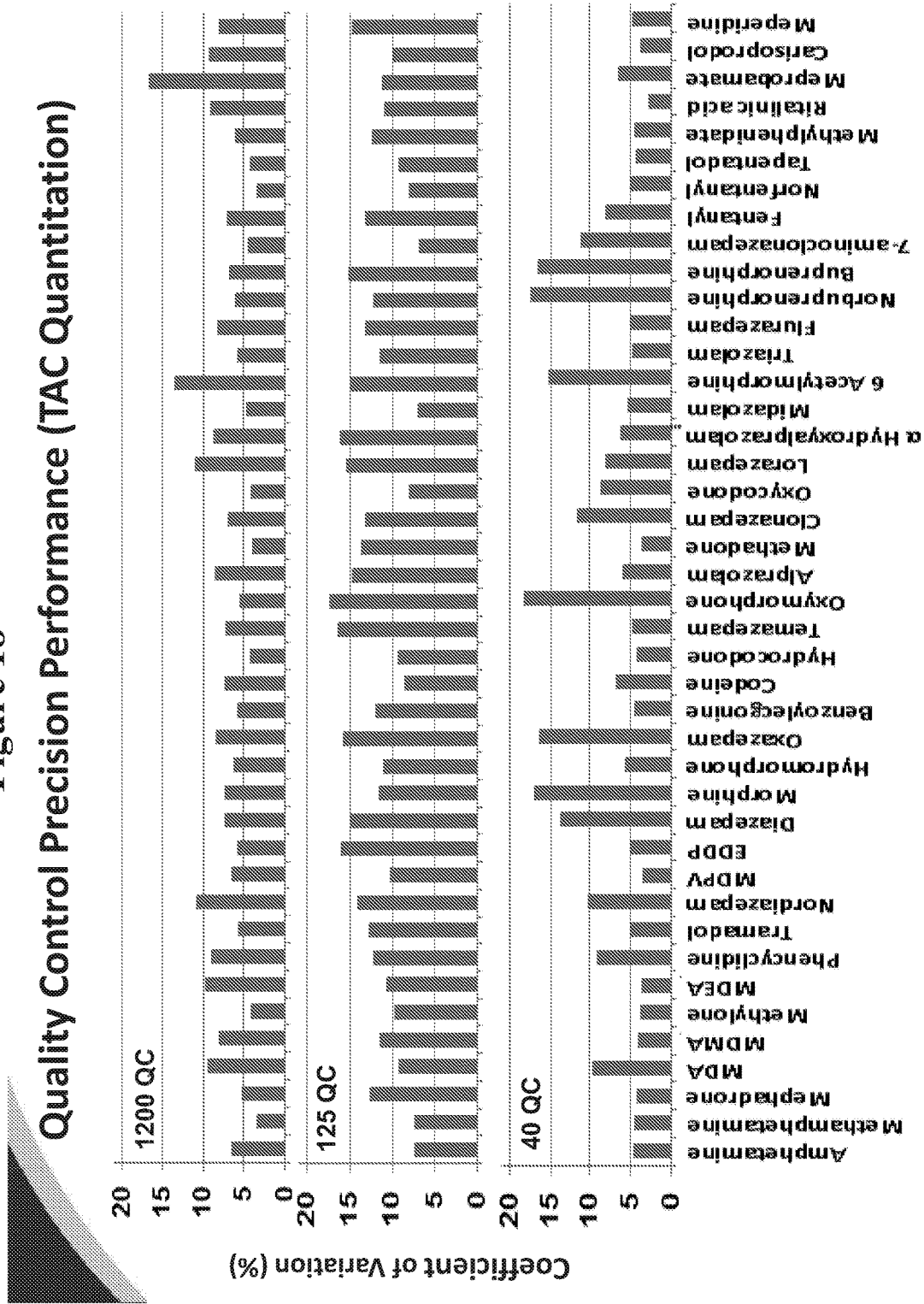
FIG. 18 illustrates the quality control precision of TAC quantitation according to the methods described herein.

In the TAC quantitative method described herein, it was unexpectedly discovered that a concentration of reference analyte, many times greater than the threshold concentration used in exemplary embodiments of the TAC screening and detection technique disclosed herein, resulted in a linearization of the relationship between TAC ratio and concentration, as shown in e.g., FIG. 15. For example, a concentration of reference analyte of about 50% of an upper limit of desired quantitation of the analyte resulted in the described linear relationship that could not be achieved when the reference analyte was at a threshold concentration.

The amount of sample used in the methods described herein are dependent upon various factors such as instruments sensitivity, availability, stability, etc. In one embodiment, about 500 uL of a sample is used. Samples/specimens may be refrigerated or frozen until analysis. After analysis, in some embodiments, negative testing samples are saved refrigerated (2-8° C.) or frozen (<0° C.) for one month. In some embodiments, non-negative testing samples are saved frozen (<0° C.) for one year.

Drugs and analytes of interest to be screened by the present methods are not limited and may include any therapeutic or designer drug, or general analyte of interest. For examples, in some aspects the methods described herein may be used as screening methods for toxicology purposes (such as for legal, clinical, and employment) and may include e.g., a targeted list of therapeutic, illicit and designer drugs comprising sympathomimetic, opioid, benzodiazepine, cocaine, and hallucinogens.

Chromatographic instrumentation and column chemistries compatible with the methods described herein include e.g., those which are capable of separating drugs and analytes of interest from a sample. Such instrumentation and column chemistries include e.g., normal phase chromatography, reversed phase chromatography, carbon dioxide based chromatography, size exclusion chromatography, ion exchange chromatography, hydrophilic interaction liquid interaction chromatography, hydrophobic interaction chromatography, affinity chromatography, and combinations thereof. Column materials may comprise materials that can be used to separate drugs and analytes of interest from a sample. Such columns include for example, silica-based (e.g., organic/inorganic hybrid silica, high strength silica) and polymer based (e.g., hydrophilic polymer beads) preparative columns, analytical columns and capillary columns, or combinations thereof.

In one embodiment, the chromatographic instrumentation used herein is a UPLC-MS/MS system (e.g., Waters Acquity UPLC® I-Class liquid chromatography system, Waters autosampler and Waters Xevo® TQD mass spectrometer, each available from Waters Corporation, Milford Mass.).

In one embodiment, the column chemistries comprise an analytical column comprising hybrid based silica particles (e.g., Acquity UPLC® BEH Phenyl chromatography column, 1.7 um, 2.1×50 mm available from Waters Corporation, Milford Mass.).

For example, the concentration of the reference analyte can greater than about 15% of an upper limit of quantitation of the analyte. In some embodiments, the defined concentration of the reference analyte can be greater than about 25% of an upper limit of quantitation of the analyte. In some embodiments, the defined concentration of the reference analyte can be greater than about 30% of an upper limit of quantitation of the analyte. In some embodiments, the defined concentration of the reference analyte can be greater than about 50% of an upper limit of quantitation of the analyte. In some embodiments, the defined concentration of the reference analyte can be in the range of about 30% of an upper limit of quantitation of the analyte to about 50% of an upper limit of quantitation of the analyte. The relationship between TAC ratio and concentration is calibrated for each analyte. The calibrated quantitation relationship can then be used for quantitative drug detection.

Figure 19:
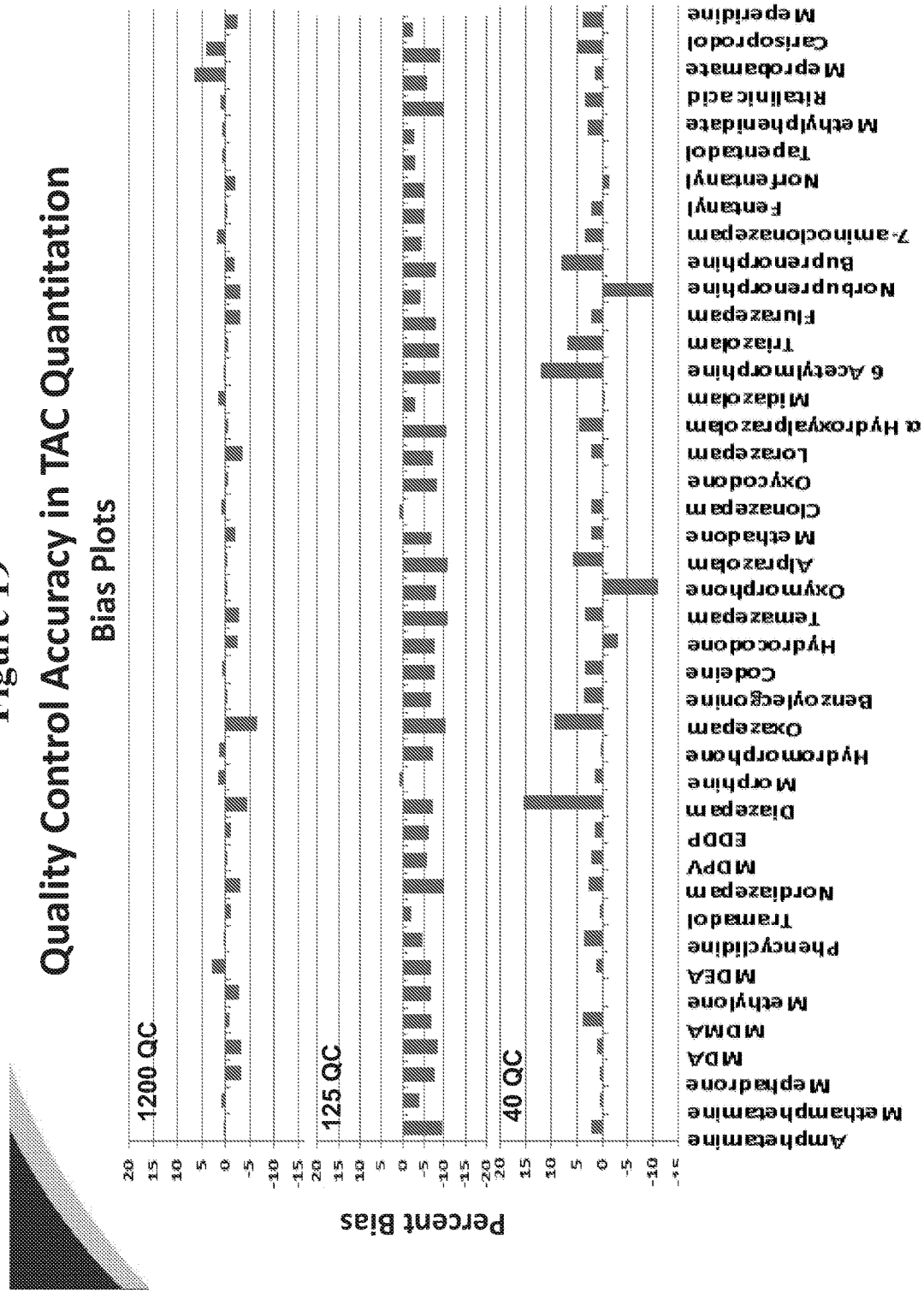
FIG. 19 illustrates bias plots for TAC quantitation according to the methods described herein.

In one embodiment, quantitation is achieved within less than about 20% variation from actual quantities using the disclosed TACQ methodology. See e.g., FIGS. 17 and 18. In another embodiment, quantitation results are achieved within less than about 20% bias using the disclosed TACQ methodology. See e.g., FIG. 19. In yet another embodiment, quantitation is achieved within less than about 20% variation from actual quantities and within less than about 20% bias using the disclosed TACQ methodology for the full range of analytes disclosed. See e.g., FIGS. 17-19 and the Exemplification section that follows.

EXEMPLIFICATION

The following represents an exemplary procedure for detecting analytes in biological specimens comprising the methods described herein.

Instrumentation

UPLC-MS/MS System

Waters Acquity UPLC® I-Class liquid chromatography system, Waters autosampler and Waters Xevo® TQD mass spectrometer, each available from Waters Corporation, Milford Mass.).

Analytical Column:

Acquity UPLC® BEH Phenyl chromatography column, 1.7 um, 2.1×50 mm available from Waters Corporation, Milford Mass., part # 186002884). Column temperature 45° C.

Gases

Nitrogen generator (Peak Scientific DR11). Pressure set at 100 p.s.i.

Argon (UN1006 UHP-35 tank) Airgas East, Karner Road, Albany NT 12205. Argon gas collision cell pressure should be approximately $4.5 \times 10^{-3}$.

MSD Calibration

The mass detectors (MS1 and MS2) are calibrated with a sodium iodide and cesium iodine mixture over a mass range for static analysis of 20 Da-925 Da and for scanning analysis of 20 Da-1000 Da. Calibration is performed in accordance with instrument manufacturer's recommendations.

Mobile Phase

Mobile phase A: 2 mM ammonium formate and 0.1% formic acid in water; Mobile phase B: 2 mM ammonium formate and 0.1% formic acid in Methanol; Injection volume: 10 uL; Run Time: 3.3 min; and Needle wash (Solvent B): 6 sec pre-injection - 12 sec post injection Gradient

| Time (min) | Flow Rate | % A | % B | Curve |
|---|---|---|---|---|
| Initial | 0.600 | 98 | 2 | initial |
| 0.5 | 0.600 | 98 | 2 | 1 |
| 2.2 | 0.600 | 30 | 70 | 6 |
| 2.7 | 0.600 | 10 | 90 | 1 |
| 3.0 | 0.600 | 98 | 2 | 1 |

Conditions

Polarity: ES+
Capillary (kV): 0.54
RF (V): 2.50
Extractor (V): 3.00
Source Temp: 150° C.
Desolvation Temp 550° C.
Desolvation Gas Flow: 1000 L/Hr
Acquisition time: 3.0 min Materials

| Chemical Entity (100 ng/mL) | General Function |
|---|---|
| Alphahydroxyalprazalam | Benzodiazepine |
| Alprazolam | Benzodiazepine |
| Amphetamine | CNS stimulant |
| Benzoylecgonine | Primary metabolite of cocaine |
| Buprenorphine | Opioid |
| Clonazepam | Benzodiazepine |
| Codeine | Opioid |
| Diazepam | Benzodiazepine |
| 2-Ethylidene-1,5-dimethyl-3,3-diphenylpyrrolidine (EDDP) | (Metabolite of Methadone) |
| Flurazepam | Benzodiazepine |
| Hydrocodone | Opioid |
| Hydromorphone | Opioid |
| Lorazepam | Benzodiazepine |
| 3,4-Methylenedioxy-amphetamine (MDA) | Hallucinogen |
| 4-Methylenedioxy-N-ethyl-amphetamine (MDEA) | Psychoactive |
| 3,4-Methylenedioxy-methamphetamine (MDMA) | Psychoactive |
| Methylenedioxypyrovalerone (MDPV) | Psychoactive |
| Mephadrone | Stimulant |
| Methadone | Analgesic |
| Methamphetamine | CNS stimulant |
| Methylone | CNS stimulant |
| Midazalam | Benzodiazepine/Anesthetic |
| Morphine | Analgesic |
| Nordiazepam | Benzodiazepine |
| Oxazepam | Benzodiazepine |
| Oxycodone | Opioid |
| Oxymorphone | Opioid |
| PCP (Phencyclidine) | Anesthetic |
| Temazepam | Benzodiazepine |
| Tramadol | Opioid |
| Triazolam | Benzodiazepine |

Procedure

Prepare a 96-well filtration plate (e.g., Sirocco) as shown below using two adjacent column wells for each sample tested, with the first column marked neat ("N") and the second column marked spike ("S"). Clearly mark all used well on the Sirocco plate. See also e.g., FIGS. 9-11.

Use the following plate template for worksheet identification of neat and spike well positions for all standard, control and test sample included in the analysis.

| | 1 Neat | 2 Spike | 3 Neat | 4 Spike | 5 Neat | 6 Spike |
|---|---|---|---|---|---|---|
| A | Cal Neat | Cal Spiked | Case 3 Neat | Case 3 Spiked | Case11 Neat | Case11 Spiked |
| B | QC75 Neat | QC75 Spiked | Case 4 Neat | Case 4 Spiked | Case12 Neat | Case12 Spiked |
| C | QC125 Neat | QC125 Spiked | Case 5 Neat | Case 5 Spiked | Case13 Neat | Case13 Spiked |
| D | QCM3G Neat | QCM3G Spiked | Case 6 Neat | Case 6 Spiked | Case14 Neat | Case14 Spiked |
| E | QC1000 Neat | QC1000 Spiked | Case 7 Neat | Case 7 Spiked | Case15 Neat | Case15 Spiked |
| F | QCNeg Neat | QCNeg Spiked | Case 8 Neat | Case 8 Spiked | Case16 Neat | Case16 Spiked |
| G | Case 1 Neat | Case 1 Spiked | Case 9 Neat | Case 9 Spiked | Case17 Neat | Case17 Spiked |
| H | Case 2 Neat | Case 2 Spiked | Case10 Neat | Case10 Spiked | Case18 Neat | Case18 Spiked |

|   | 7<br>Neat | 8<br>Spike | 9<br>Neat | 10<br>Spike | 11<br>Neat | 12<br>Spike |
|---|---|---|---|---|---|---|
| A | Case19 Neat | Case19 Spiked | Case27 Neat | Case27 Spiked | Case35 Neat | Case35 Spiked |
| B | Case20 Neat | Case20 Spiked | Case28 Neat | Case28 Spiked | Case36 Neat | Case36 Spiked |
| C | Case21 Neat | Case21 Spiked | Case29 Neat | Case29 Spiked | Case37 Neat | Case37 Spiked |
| D | Case22 Neat | Case22 Spiked | Case30 Neat | Case30 Spiked | Case38 Neat | Case38 Spiked |
| E | Case23 Neat | Case23 Spiked | Case31 Neat | Case31 Spiked | Case39 Neat | Case39 Spiked |
| F | Case24 Neat | Case24 Spiked | Case32 Neat | Case32 Spiked | Case40 Neat | Case40 Spiked |
| G | Case25 Neat | Case25 Spiked | Case33 Neat | Case33 Spiked | Case41 Neat | Case41 Spiked |
| H | Case26 Neat | Case26 Spiked | Case34 Neat | Case34 Spiked | Cal Neat | Cal Spiked |

Obtain from the refrigerator or prepare fresh the Working Methapyrilene Recovery Standard (RS), Threshold Calibrator (Spike), Assay Calibrator (Cal), QC75, QC125, and QC1000 reagents.

Prepare sufficient hydrolysis reagents for performance of the current day's analysis.

Record all calibrator, QC and other reagent lot numbers and expiration dates on the back of the plate worksheet for all reagents used in the batch analysis.

Add 200 uL of standard, control or specimen to the neat and spiked wells with appropriately identified of samples in accordance with the plate worksheet.

Add 50 ul of negative urine to all neat wells used in the analysis.

Add 50 uL of Spike to all spike wells used in the analysis.

Add 50 uL of Recovery Standard to all analysis wells.

Mix the wells by a gentle circular sliding of the plate on the bench-top for at least 10 seconds.

Add 50 uL of Buffered Glucuronidase to all analysis wells and repeat the circular mixing technique.

Cover the analysis plate with aluminum foil and incubate in the oven at 55° C. for one hour.

At the completion of the incubation add 600 uL of starting mobile phase to all analysis wells and repeat mixing technique.

Place a 96-well collection plate in the filtration apparatus and, after proper alignment of the Sirocco analysis plate on top of the apparatus, apply negative pressure for filtration of the diluted reaction mixtures into the collection plate.

Following filtration, place and align the collection plate in the autosampler (Acquity I Class autosampler) and set up a sample list using software (Waters MassLynx software).

Set up a sample list use the sample file names with the current date followed by the sample name as indicated on the plate worksheet. The following is an example of file names along with the injection order to be used in the UPLC-MS/MS analysis:

| Injection 1 | 080614_QC Neg (N) | well 1:6 |
|---|---|---|
| Injection 2 | 080614_QC Neg (N) | well 1:6 |
| Injection 3 | 080614_Cal neat N | well 1:1 |
| Injection 4 | 080614_Cal spiked (S) | well 1:9 |
| Injection 5 | 080614_QC75 N | well 1:2 |
| Injection 5 | 080614_QC75 S | well 1:10 |
| Injection 6 | 080614_QC125 N | well 1:3 |
| Injection 7 | 080614_QC125 S | well 1:11 |
| Injection 6 | 080614_M3GQC | well 1:4 |
| Injection 6 | 080614_M3GQC S | well 1:12 |
| Injection 8 | 080614_QC1000 N | well 1:5 |
| Injection 9 | 080614_QC1000 S | well 1:13 |
| Injection 10 | 080614_QCNeg N | well 1:6 |
| Injection 11 | 080614_QCNeg S | well 1:14 |
| Injection 12 | 080614_ID Test Sample 1 N | well 1:7 |
| Injection 13 | 080614_ID Test Sample 1 S | well 1:15 |
|  | Remaining sample(s) in similar order |  |
| Injection (second from last) | 080614_Cal 100 N | well (second to last) |
| Injection (last) | 080614_Cal 100 S | well (last) |

Identify and enter the correct well position of each analysis on the sample list using the established 96-well injection plate format used in the inlet method.

Select a 10 uL sample injection volume for all injections.

Browse in the correct Inlet and MS files on the sample list (select Threshold Standardized Screening in both files). Copy-down these files for use of the same inlet and MS file with each injection.

Save the sample list with the analysis date and method identified (e.g., 080614_Threshold Standardized Screen).

Turn on both the nitrogen and argon collision gas and then turn on the MS source by e.g., opening the MassLynx TUNE page and clicking on the gas icon on the top toolbar.

Start mobile phase pumping into the analytical column if priming is not needed by e.g., opening the MassLynx INLET page and open the inlet method called Threshold Standardized Screening. If priming is needed, prime mobile phase A and B prior to column pumping by e.g., opening the CONSOL page. (Note: When no other inlet methods have been in use since the last Threshold Standard Screening analysis priming is not needed).

Monitor the column pressure on e.g., the MassLynx CONSOL page. Stable pressure is attained when the delta pressure over time is below 100 psi.

When pressure stabilizes select all samples by e.g., going to the Sample page and select all sample prior to selecting the run icon (arrow head pointing to the right at the top of the page).

When first spiked sample has been acquired view the total SRM chromatogram to verify the presence of the analyte transition ions within the acquisition window and proper peak symmetry.

Results

According to an exemplary embodiment, to report an analyte as positive:

retention time must be within 0.3 minutes of expected;
transition ion ratio must within acceptable limits (compared to 50 ng/ml standard);
ratio >0.50 must be within 20% of expected;
ratio 0.20 to <0.50 must be within 25% of expected;
ratio 0.10 to <0.20 must be within 30% of expected;
ratio <0.10 must be within 50% of expected;
quality control analyses including hydrolysis control must meet quality control criteria; and
if the samples injection following an analyte(s) positive case injection is positive for the same analyte(s) and if the initial positive results has greater ion area than the QC1000 analysis then both the neat and spiked sample analysis on this subsequent case must be repeated to confirm a screen positive result prior to reporting.

All negative test results may be reported in both clinical and forensic testing by this method. Positive test results in clinical testing may also be reported. In forensic testing, cases with positive findings require re-testing of a primary specimen using an alternate testing method.

All results should be reviewed and certified by a certifying scientist or the laboratory director prior to reporting.

One of ordinary skill in the art will appreciate further features and advantages of the invention based on the above-described embodiments. Accordingly, the invention is not to be limited by what has been particularly shown and described, except as indicated by the appended claims.

The invention claimed is:

1. A method for detecting analytes in biological specimens, comprising:
    analyzing a first sample using a chromatography system to obtain a first result, the first sample including a first portion of a biological specimen;
    analyzing a second sample using the chromatography system to obtain a second result, the second sample including a second portion of the biological specimen and a reference analyte at a defined concentration, wherein the first sample does not include the reference analyte; and
    calculating a ratio between (i) the first result and (ii) a difference between the second result and the first result.

2. The method of claim 1, further comprising comparing the ratio to a calibrated threshold ratio.

3. The method of claim 2, further comprising determining a threshold analyte finding based on said comparison.

4. The method of claim 2, wherein the steps for calculating the calibrated threshold ratio comprise:
    analyzing a known sample of a biological specimen to obtain a first calibration result;
    analyzing a combination of the known sample and the reference analyte at the defined concentration to obtain a second calibration result; and
    calculating the calibrated threshold ratio as a ratio between (i) the first calibration result and (ii) a difference between the second calibration result and the first calibration result.

5. The method of claim 4, wherein the defined concentration of the reference analyte is a threshold concentration of the analyte.

6. The method of claim 4, wherein the defined concentration of the reference analyte is in the range of about 10% of a threshold concentration of the analyte to about 750% of a threshold concentration of the analyte.

7. A method for quantifying analytes in biological specimens, comprising:
    analyzing a first sample using a chromatography system to obtain a first result, the first sample including a first portion of a biological specimen;
    analyzing a second sample using the chromatography system to obtain a second result, the second sample including a second portion of the biological specimen and a reference analyte at a defined concentration, wherein the first sample does not include the reference analyte; and
    calculating a ratio between (i) the first result and (ii) a difference between the second result and the first result;
    comparing said ratio to a calibrated quantitation relationship; and
    determining a quantity of an analyte in the biological sample based upon the calibrated quantitation relationship.

8. The method of claim 7, wherein the steps for calculating the calibrated quantitation relationship comprise:
    analyzing a plurality of known samples of a biological specimen to obtain a plurality of first calibration results, the plurality of known samples each including a different concentration of a known analyte;
    analyzing each of the plurality of known samples combined with the reference analyte at the defined concentration to obtain a plurality of second calibration results; and
    calculating the calibrated quantitation relationship as a linear regression of (a) a plurality of ratios between (i) each of the plurality of first calibration results and (ii) a corresponding difference between each of the second calibration results and each of the first calibration results and (b) the corresponding different concentrations of the known analyte in the known samples.

9. The method of claim 8, wherein the different concentrations of a known analyte in the plurality of known samples include at least a first concentration at a lower limit of quantitation and a second concentration at an upper limit of quantitation.

10. The method of claim 8, wherein the different concentrations of a known analyte in the plurality of known samples include a plurality of concentrations between a lower limit of quantitation and an upper limit of quantitation.

11. The method of claim 8, wherein the defined concentration of the reference analyte is greater than about 15% of an upper limit of quantitation of the analyte.

12. The method of claim 8, wherein the defined concentration of the reference analyte is greater than about 25% of an upper limit of quantitation of the analyte.

13. The method of claim 8, wherein the defined concentration of the reference analyte is greater than about 30% of an upper limit of quantitation of the analyte.

14. The method of claim 8, wherein the defined concentration of the reference analyte is greater than about 50% of an upper limit of quantitation of the analyte.

15. The method of claim 8, wherein the defined concentration of the reference analyte is in the range of about 30% of an upper limit of quantitation of the analyte to about 50% of an upper limit of quantitation of the analyte.

16. A method for detecting and quantifying analytes in biological specimens, comprising:
    analyzing a first sample using a chromatography system to obtain a first result, the first sample including a first portion of a biological specimen;
    analyzing a second sample using the chromatography system to obtain a second result, the second sample including a second portion of the biological specimen and a reference analyte at a defined concentration, wherein the first sample does not include the reference analyte; and
    calculating a ratio between (i) the first result and (ii) a difference between the second result and the first result, comparing said ratio to a calibrated quantitation relationship; and
    based on said comparison, determining both a quantity of an analyte in the biological specimen and a threshold analyte finding.

17. The method of claim 16, wherein the steps for calculating the calibrated quantitation relationship comprise:
    analyzing a plurality of known samples of a biological specimen to obtain a plurality of first calibration results, the plurality of known samples each including a different concentration of a known analyte;
    analyzing each of the plurality of known samples combined with the reference analyte at the defined concentration to obtain a plurality of second calibration results; and calculating the calibrated quantitation relationship as a linear regression of (a) a plurality of ratios between (i) each of the plurality of first calibration results and (ii) a corresponding difference between each of the second calibration results and each of the first calibration results and (b) the corresponding different concentrations of the known analyte in the known samples.

18. The method of claim 17, wherein the different concentrations of a known analyte in the plurality of known samples include at least a first concentration at a lower limit of quantitation and a second concentration at an upper limit of quantitation.

19. The method of claim 18, wherein a threshold concentration of the analyte is between the first concentration and the second concentration.

20. The method of claim 16, wherein the defined concentration of the reference analyte is greater than about 50% of an upper limit of quantitation of the analyte.

* * * * *